US012121481B2

(12) United States Patent
Mulhern et al.

(10) Patent No.: US 12,121,481 B2
(45) Date of Patent: Oct. 22, 2024

(54) ANTI-TIP MOTORIZED VEHICLE

(71) Applicant: Pride Mobility Products Corporation, Duryea, PA (US)

(72) Inventors: James Mulhern, Nanticoke, PA (US); Stephen Antonishak, Nanticoke, PA (US)

(73) Assignee: Pride Mobility Products Corporation, Duryea, PA (US)

( * ) Notice: Subject to any disclaimer, the term of this patent is extended or adjusted under 35 U.S.C. 154(b) by 0 days.

(21) Appl. No.: 18/004,238

(22) PCT Filed: Jul. 7, 2021

(86) PCT No.: PCT/US2021/040762

§ 371 (c)(1),
(2) Date: Jan. 24, 2023

(87) PCT Pub. No.: WO2022/011062

PCT Pub. Date: Jan. 13, 2022

(65) Prior Publication Data

US 2023/0263675 A1 Aug. 24, 2023

Related U.S. Application Data

(60) Provisional application No. 63/049,183, filed on Jul. 8, 2020.

(51) Int. Cl.
*A61G 5/10* (2006.01)

(52) U.S. Cl.
CPC ........ *A61G 5/1089* (2016.11); *A61G 2203/36* (2013.01); *A61G 2203/42* (2013.01)

(58) Field of Classification Search
CPC .............. A61G 5/1089; A61G 2203/36; A61G 2203/42; A61G 5/06
See application file for complete search history.

(56) References Cited

U.S. PATENT DOCUMENTS

| | | | | |
|---|---|---|---|---|
| 6,059,060 | A * | 5/2000 | Kanno | A61G 5/045 180/907 |
| 6,357,793 | B1 | 3/2002 | Dickie et al. | |
| 2003/0201632 | A1 | 10/2003 | Mulhern et al. | |
| 2004/0004342 | A1* | 1/2004 | Mulhern | G06F 9/383 712/E9.047 |
| 2004/0032119 | A1* | 2/2004 | Tran | A61G 5/1075 280/755 |
| 2005/0077694 | A1 | 4/2005 | Levi et al. | |

(Continued)

OTHER PUBLICATIONS

International Search Report and Written Opinion, dated Oct. 19, 2021, for the corresponding International Patent Application No. PCT/US2021/040762, 7 pages.

(Continued)

*Primary Examiner* — Drew J Brown
(74) *Attorney, Agent, or Firm* — Morgan, Lewis & Bockius LLP

(57) ABSTRACT

A motorized vehicle may include a frame, a drive wheel coupled to the frame, a motor operatively coupled to the drive wheel, and an anti-tip assembly including a first anti-tip wheel. The anti-tip assembly may have a first configuration wherein the first anti-tip wheel is both pivotable about a pivot axis relative to the frame and translatable along a sliding axis.

181 Claims, 10 Drawing Sheets

(56) References Cited

U.S. PATENT DOCUMENTS

| | | | | |
|---|---|---|---|---|
| 2005/0077714 | A1* | 4/2005 | Mulhern .............. | A61G 5/1078<br>280/755 |
| 2005/0077715 | A1* | 4/2005 | Mulhern .............. | A61G 5/1089<br>280/755 |
| 2005/0206149 | A1* | 9/2005 | Mulhern .............. | A61G 5/1078<br>280/755 |
| 2006/0091663 | A1 | 5/2006 | Jackson et al. | |
| 2013/0009382 | A1 | 1/2013 | Hay | |

OTHER PUBLICATIONS

International Preliminary Report on Patentability, dated Jan. 10, 2023, for the corresponding International Patent Application No. PCT/US2021/040762, 1 page.

* cited by examiner

ANTI-TIP MOTORIZED VEHICLE

CROSS-REFERENCE TO RELATED APPLICATIONS

This application claims the benefit of U.S. Provisional Patent Application No. 63/049,183 filed Jul. 8, 2020 entitled "Anti-Tip Motorized Vehicle", which is incorporated by reference herein in its entirety.

FIELD OF THE INVENTION

The present invention generally relates to motorized vehicle and, more particularly, to a motorized vehicle including an anti-tip assembly.

BRIEF SUMMARY OF THE INVENTION

In one embodiment there is a motorized vehicle including a frame, a drive wheel coupled to the frame, a motor operatively coupled to the drive wheel, and an anti-tip assembly including a first anti-tip wheel. The anti-tip assembly may have a first configuration wherein the first anti-tip wheel is both pivotable about a pivot axis relative to the frame and translatable along a sliding axis.

The first anti-tip wheel may be coupled to a pivot arm disposed about the sliding axis and the pivot arm may be coupled to the frame at the pivot axis. The first anti-tip wheel may be rotatable about a rotation axis, pivotable about a pivot axis relative to the frame, and translatable along a sliding axis. In the first configuration, the first anti-tip wheel may be translatable along the sliding axis independently of being pivotable about the pivot axis. In the first configuration, the first anti-tip wheel may be translatable along the sliding axis from a first position to a second position. In the first configuration, the first anti-tip wheel may be biased toward the first position. In the first configuration, the first anti-tip wheel may be pivotable about the pivot axis from an extended position to a retracted position, the retracted position being rearward of the extended position.

In a further embodiment, the motorized vehicle includes a biasing element coupled to the pivot arm and to the frame wherein, in the first configuration, the biasing element may be configured to bias the first anti-tip wheel toward the extended position. The first anti-tip wheel may be biased toward the first position by a first biasing element and may be biased toward the extended position by a second biasing element that may be different from the first biasing element. A biasing force of the first biasing element may be less than a biasing force of the second biasing element. The anti-tip assembly may have a second configuration wherein the first anti-tip wheel may be both pivotable about the pivot axis and translatable along the sliding axis, the first anti-tip wheel being pivotable about the pivot axis to a greater extent in the first configuration than in the second configuration.

The anti-tip assembly may have a third configuration wherein the first anti-tip wheel may be both pivotable about the pivot axis and translatable along the sliding axis, the first anti-tip wheel being translatable along the sliding axis to a greater distance in the first configuration than in the third configuration. The first anti-tip assembly may have a fourth configuration wherein the anti-tip wheel may be both pivotable about the pivot axis and translatable along the sliding axis, the anti-tip wheel being pivotable about the pivot axis to a greater extent in the first configuration than in the fourth configuration and translatable along the sliding axis to a greater extent in the first configuration than the fourth configuration. The anti-tip assembly may include a second anti-tip wheel which may be substantially fixed against translation and pivot relative to frame.

When the motorized vehicle is in a normal operating mode characterized by a travel along substantially level ground, the first anti-tip wheel may be positioned at a first distance off the ground and the second anti-tip wheel may be positioned at a second distance off the ground wherein the first distance off the ground may be less than the second distance off the ground. The first anti-tip wheel may be pivotable to a third distance off the ground that may be at least as long as the second distance off the ground. In a further embodiment, the motorized vehicle includes an anti-tip lock that may be configured to move between a locked configuration and an unlocked configuration wherein, in the locked configuration, the anti-tip assembly is in the second configuration. The anti-tip lock may be configured to pivot from the unlocked configuration to the locked configuration, the anti-tip lock may be configured to engage a first stop coupled to the frame when the anti-tip assembly is in the first configuration, and the anti-tip lock may be configured to engage a second stop coupled to first anti-tip wheel when the anti-tip assembly is in the second configuration.

The anti-tip lock may be configured to restrict at least one of translation and rotation of the first anti-tip wheel when the anti-tip lock is in the locked configuration. The first anti-tip wheel may be translatable along the sliding axis by a shorter distance when the anti-tip lock is in the locked configuration than when the anti-tip lock is in the unlocked configuration. In a further embodiment, the motorized vehicle may include a controller configured to cause an actuator signal to be sent to an actuator to move the anti-tip lock between the locked configuration and the unlocked configuration. In a further embodiment, the motorized vehicle may include a condition sensor configured to sense a condition of the motorized vehicle, wherein the condition sensor may be configured to send a condition signal to the controller indicative of the sensed condition of the motorized vehicle and the actuator signal may be based on the condition signal. The condition sensor may be configured to sense at least one of tilt, acceleration, deceleration, velocity and combinations thereof. The condition sensor may comprise at least one of a tilt sensor, an accelerometer, a velocity sensor, a gyroscope, a position sensor, a GPS sensor and combinations thereof.

The second anti-tip wheel may be positioned between the drive wheel and the first wheel when the anti-tip assembly is in the retracted position and the motorized vehicle is viewed from the front of the motorized vehicle. In a further embodiment, the motorized vehicle includes a second anti-tip assembly identical to the first anti-tip assembly that operates independently of the first anti-tip assembly. The sliding axis may be oriented at an acute angle to a line that is normal to a flat level ground surface when the motorized vehicle is operating on the flat level ground surface. The acute angle may be configured to prevent the first anti-tip wheel from pivoting when the first anti-tip wheel engages a ground surface in response to the motorized vehicle traveling on a downslope. The acute angle may be configured to allow the first anti-tip wheel to pivot when the first anti-tip wheel engages an obstruction in a path of the motorized vehicle. The acute angle may be about 20 degrees. The threshold level of the down slope may be in the range of about 10 degrees to 25 degrees. The acute angle may be within 5 degrees of the smallest angle such that, if selected as the acute angle, the drive wheel would have a reduced traction with the ground surface when the first anti-tip wheel engaged an obstruction in the path of the motorized vehicle. In the first position, the first anti-tip wheel may be translatable along a sliding axis to a maximum sliding distance of approximately 0.75 inches. The motorized vehicle may have a longitudinal axis, and a centerline of the drive wheel may be separated from the a centerline of the first anti-tip wheel along the longitudinal axis by a distance of approximately 9 inches.

BRIEF DESCRIPTION OF THE SEVERAL VIEWS OF THE DRAWINGS

The foregoing summary, as well as the following detailed description of embodiments of the motorized vehicle, will be better understood when read in conjunction with the appended drawings of an exemplary embodiment. It should be understood, however, that the invention is not limited to the precise arrangements and instrumentalities shown. For example, although not expressly stated herein, features of one or more various disclosed embodiments may be incorporated into other of the disclosed embodiments.

In the drawings.

DETAILED DESCRIPTION OF THE INVENTION

Figure 1:
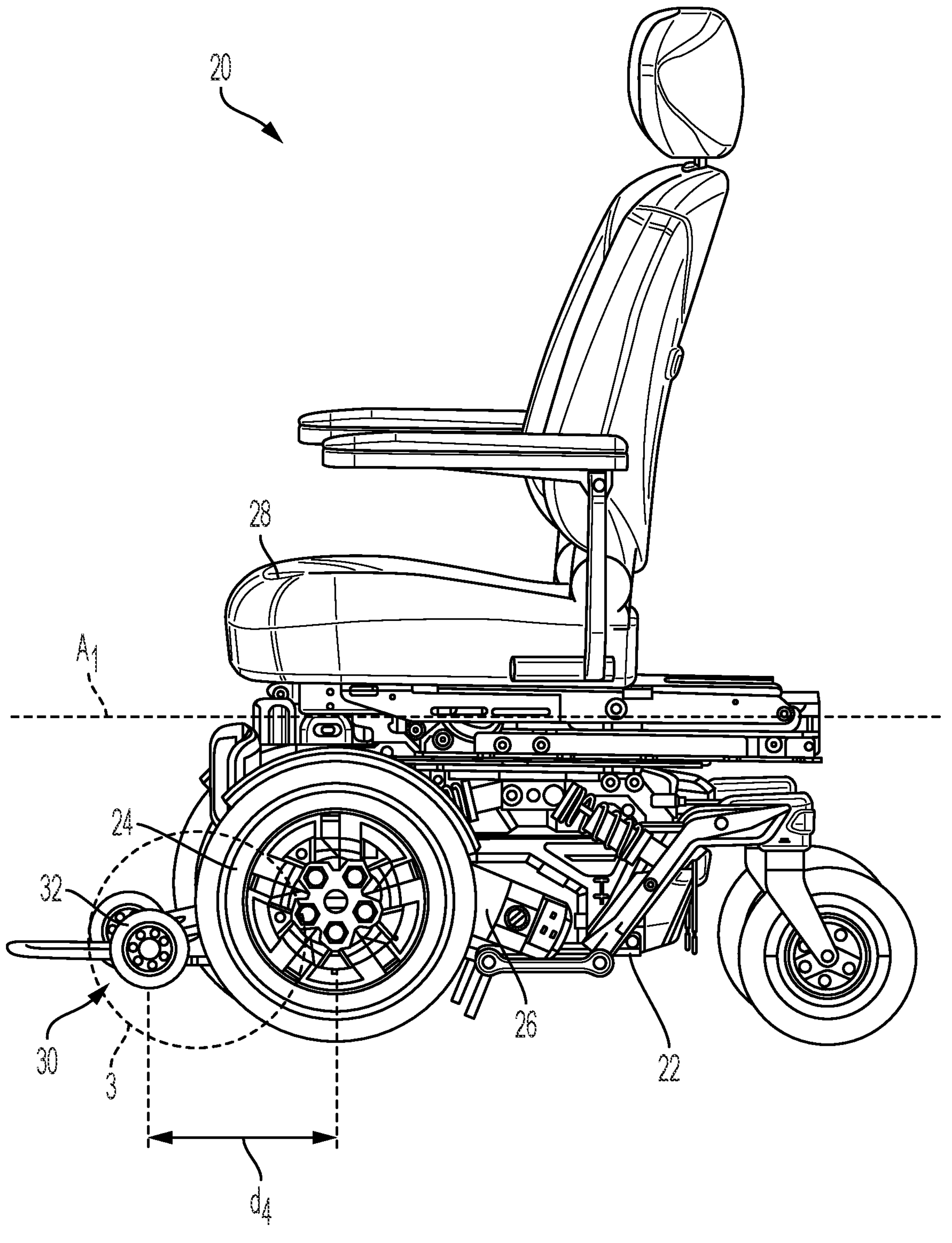
FIG. 1 is a side elevational view of a vehicle in accordance with an exemplary embodiment of the present invention.

Referring to the drawings in detail, wherein like reference numerals indicate like elements throughout, there is shown in FIGS. 1-10 a vehicle, generally designated 20, in accordance with an exemplary embodiment of the present invention.

In some embodiments, the vehicle 20 (e.g., a wheelchair, scooter, or wagon) is configured to transport a user. In some embodiments, the vehicle includes a frame 22 and a drive means coupled to the frame. In some embodiments, the drive means includes a drive wheel 24. In some embodiments, the drive means includes a motor 26 operatively coupled to the drive wheel 24. In some embodiments, the vehicle 20 includes an energy source configured to supply power to the motor. In some embodiments, the energy source is a battery. In other embodiments, the energy source is fuel (e.g., gasoline or diesel). In some embodiments, the drive wheel 24 is coupled to a forward end of the frame 22.

In some embodiments, the vehicle 20 includes a receiving area for a user. In some embodiments, the receiving area is a seat 28. In other embodiments, the receiving area is a platform or base such that a user can stand while using the vehicle 20.

Vehicle 20 may include a stabilizer configured to maintain an orientation of the vehicle relative to a surface (e.g., the ground). Stabilizer may include a first anti-tip assembly 30 coupled to the frame 22. In some embodiments, the first anti-tip assembly 30 is fixed to the frame 22. In other embodiments, the first anti-tip assembly 30 is detachably coupled to the frame 22. In some embodiments, a kit includes one or more first anti-tip assemblies that may be attached to an existing vehicle.

The first anti-tip assembly 30 may contact a ground surface when an orientation of the frame axis $A_1$ (e.g., a longitudinal axis extending from a front of vehicle frame to a rear of vehicle frame) exceeds a predetermined mount. In some embodiments, the first anti-tip assembly 30 contacts the surface when an orientation of the frame 22 relative to a horizontal surface exceeds about 1 degree to about 5 degrees, about 5 degrees to about 10 degrees, about 10 degrees to about 15 degrees, about 15 degrees to about 20 degrees, about 20 degrees to about 25 degrees, about 25 degrees to about 30 degrees, about 30 degrees to about 35 degrees, about 35 degrees to about 40 degrees, about 40 degrees to about 45 degrees, about 45 degrees to about 50 degrees, about 50 degrees to about 55 degrees, about 55 degrees to about 60 degrees, or about 60 degrees to about 65 degrees. For example, the orientation of the first anti-tip assembly 30 in a first configuration may be fixed relative to the frame 22 such that as the orientation of the frame 22 relative to a horizontal surface changes, the first anti-tip assembly 30 is brought into contact with the surface. In some embodiments, the first anti-tip assembly 30 is coupled to the front of the frame 22. In some embodiments, the first anti-tip assembly 30 extends forwardly further than at least one of the drive wheel 24, the seat 28, and the frame 22.

In some embodiments, the first anti-tip assembly 30 includes a first configuration wherein a portion of the first anti-tip assembly moves relative to the frame 22 when the first anti-tip assembly 30 contacts the surface. In some embodiments, an anti-tip assembly that moves relative to the frame provides a smoother ride for the user and/or allows the vehicle to drive over obstacles. In some embodiments, the first anti-tip assembly 30 includes a second configuration wherein the first anti-tip assembly 30 is fixed relative to the frame 22 and does not move when the first anti-tip assembly 30 contacts the surface. In some embodiments, an anti-tip assembly that is fixed relative to the frame provides greater stability than an anti-tip assembly that moves. In some embodiments, the anti-tip assembly is configured to selectively move between the first configuration and the second configuration such that the anti-tip assembly provides a smoother ride when riding on a relatively horizontal surface or at lower velocity and provides greater stability when riding on an incline or at higher velocity.

In some embodiments, the anti-tip assembly 30 includes a first anti-tip wheel 32 configured to engage the surface (FIG. 1). In some embodiments, a centerline of the drive wheel 24 is separated from a centerline of the first anti-tip wheel 32 along the longitudinal axis $A_1$ by a distance $d_4$ of about 3 inches, about 4 inches, about 5 inches, about 6 inches, about 7 inches, about 8 inches, about 9 inches, about 10 inches, about 11 inches, about 12 inches, about 13 inches, about 14 inches, about 15 inches, less than 15 inches, less than 10 inches, less than 5 inches, about 1 inch to about 5 inches, about 5 inches to about 10 inches, or about 10 inches to about 15 inches.

Figure 2:
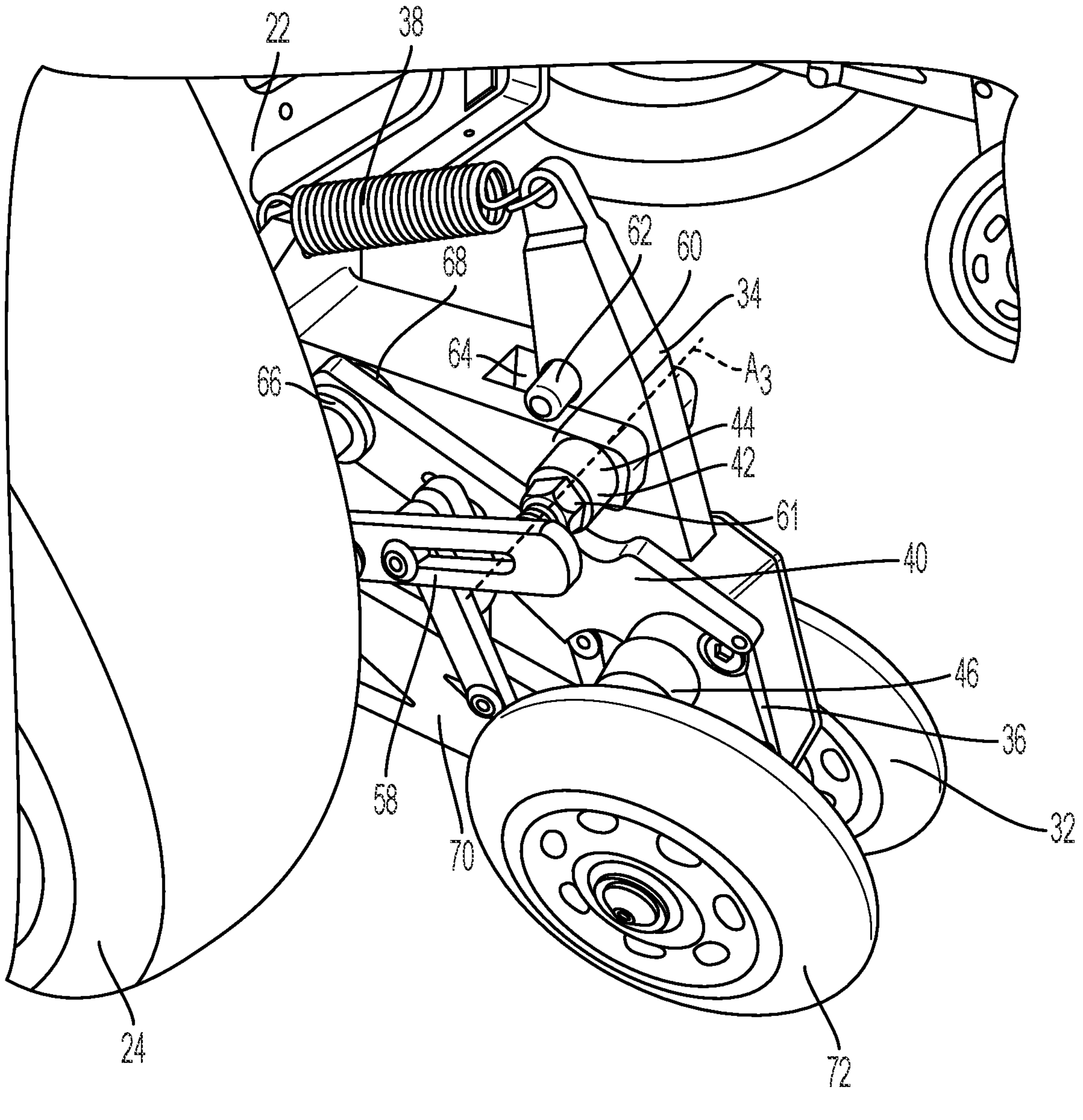
FIG. 2 is a perspective view of a portion of the vehicle of FIG. 1.

In some embodiments, the first anti-tip wheel 32 is pivotable relative to the frame 22 about a pivot axis $A_3$ (best seen in FIG. 2). In some embodiments, the first anti-tip wheel 32 is translatable along a sliding axis $A_2$ (best seen in FIG. 3). In some embodiments, the first anti-tip wheel 32 is both pivotable relative to the frame 22 about pivot axis $A_3$ and translatable along sliding axis $A_2$ when the anti-tip assembly is in the first configuration. In some embodiments, the first anti-tip assembly 30 is in the first configuration under normal operating conditions. Normal operating conditions may be when operating the vehicle on relatively flat ground.

Figure 3:
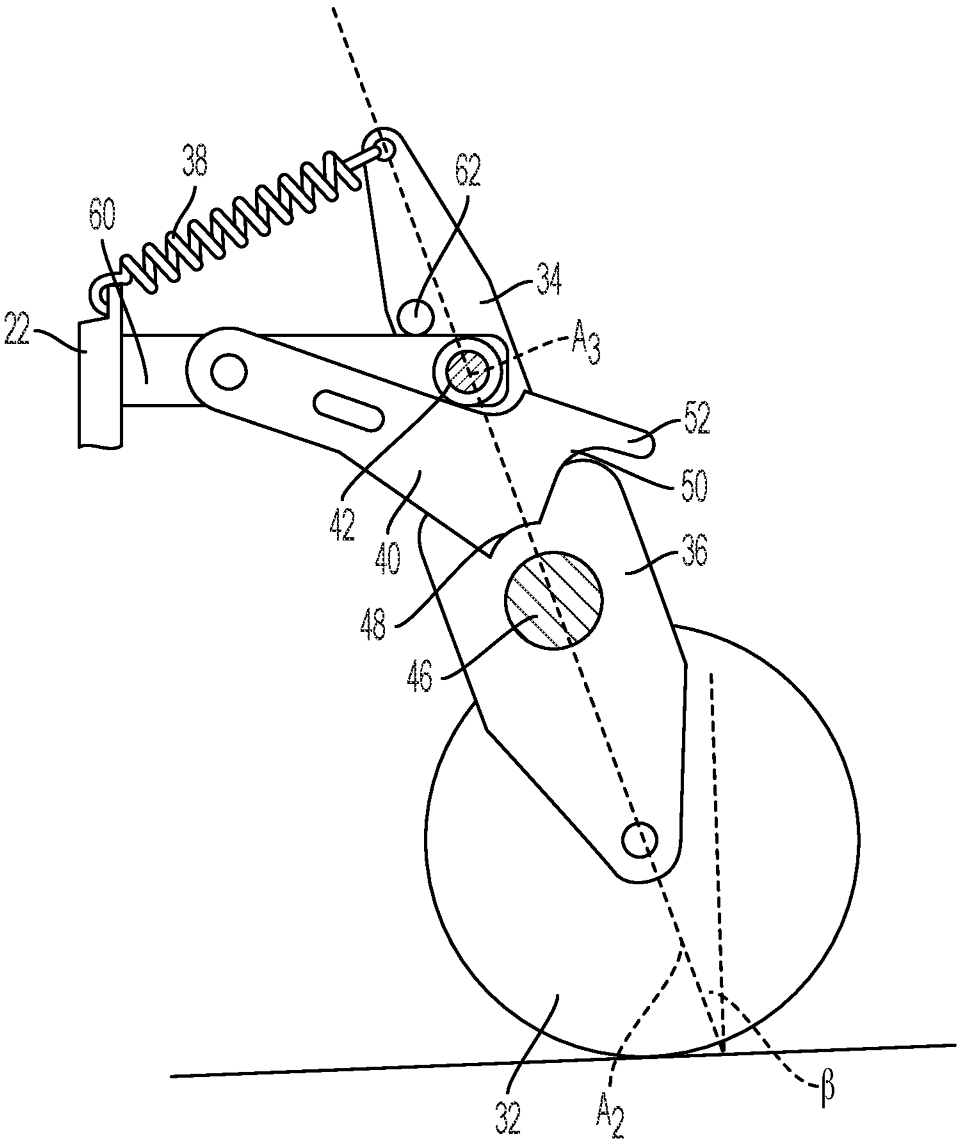
FIG. 3 is a right-side elevational view of the anti-tip assembly of FIG. 1 in a first configuration.

In some embodiments, the sliding axis $A_2$ is orientated at an acute angle β to a line that is normal to a flat level ground surface when the motorized vehicle is operating on flat level ground surface (best seen in FIG. 3). In some embodiments, the acute angle β is configured to prevent the first anti-tip wheel 32 from pivoting when the first anti-tip wheel 32 engages the ground surface in response to the motorized vehicle traveling on a downslope. In some embodiments, the acute angle β is configured to prevent the first anti-tip wheel 32 from pivoting when the first anti-tip wheel 32 engages the ground surface in response to the motorized vehicle traveling on a downslope having a steepness below a threshold level. In some embodiments, the threshold level is about 3 degrees, about 5 degrees, about 10 degrees, about 15 degrees, about 20 degrees, about 25 degrees, about 30 degrees, about 35 degrees, about 40 degrees, or about 45 degrees.

Referring to FIG. 3, in some embodiments, the acute angle β is configured to allow the first anti-tip wheel 32 to pivot when the first anti-tip wheel 32 engages an obstruction (e.g., a curb, a step, or a divot) in a path of the vehicle 20. In some embodiments, the acute angle is about 10 degrees, about 15 degrees, about 20 degrees, about 25 degrees, about 30 degrees, about 35 degrees, about 40 degrees, about 45 degrees, about 50 degrees, about 55 degrees, about 60 degrees, about 65 degrees, about 70 degrees, about 75 degrees, about 15 degrees to about 30 degrees, about 30 degrees to about 45 degrees, about 45 degrees to about 60 degrees, or about 60 degrees to about 90 degrees. In some embodiments, the acute angle β is within 5 degrees of the smallest angle such that, if selected as the acute angle, the drive wheel 24 would have reduced traction with the ground surface when the first anti-tip wheel 32 engaged an obstruction in the path of the vehicle 20.

In some embodiments, the first anti-tip wheel 32 is coupled to a pivot arm 34 (FIG. 2). In some embodiments, the pivot arm 34 is configured to pivot relative to the frame 22. In some embodiments, the pivot arm 34 is coupled to the frame 22 at the pivot axis $A_3$ such that the pivot arm 34 pivots about pivot axis $A_3$. In some embodiments, pivot arm 34 is disposed about sliding axis $A_2$.

In some embodiments, the pivot arm 34 is coupled to the frame 22 or a first frame member 60. In some embodiments, the first frame member 60 is coupled to the frame 22 (e.g., via welding, adhesive, or threaded fastener). In some embodiments, the first frame member 60 and the frame 22 are a unitary construct. In some embodiments, the first frame member 60 is fixed relative to the frame 22. In some embodiments, the first frame member 60 includes a channel 64 configured to receive the pivot arm 34. In some embodiments, the channel 64 is open ended and the pivot arm 34 is positioned in the channel 64 such that the first frame member 60 is adjacent three sides of the pivot arm 34. In other embodiments, the channel 64 is closed such that the first frame member 60 is adjacent all four sides of the pivot arm 34. In some embodiments, a shorter first frame member 60 can be used when the channel 64 is open ended.

In some embodiments, the first frame member 60 and the pivot arm 34 each include an opening configured to receive an axle 61 such that the pivot arm 34 is pivotable about the axle 61 relative to the first frame member 60. In some embodiments, the pivot axis $A_3$ is concentric with the axle 61. An proximal portion of pivot arm 34 may be proximal to a proximal end of first frame member 60.

In some embodiments, the pivot arm 34 includes a pivot arm stop 62 configured to limit the range of motion of the pivot arm 34 relative to the first frame member 60. For example, the pivot arm stop 62 may protrude from the pivot arm 34 such that the pivot arm stop 62 contacts the first frame member 60 and prevents further movement of the pivot arm 34. In some embodiments, the pivot arm stop 62 is a protrusion that extends (e.g., generally perpendicularly) from the pivot arm 34. In some embodiments, the pivot arm stop 62 is coupled to the pivot arm 34 (e.g., via adhesive, fastener, or welding). In some embodiments, the pivot arm stop 62 extends through an opening in the pivot arm 34. In some embodiments, the pivot arm stop 62 and the pivot arm 34 are a unitary construct.

In some embodiments, the pivot arm stop 62 engages the first frame member 60 before the pivot arm 34 engages the first frame member 60. In some embodiments, the position of the pivot arm stop 62 relative to the pivot arm 34 is selected based at least in part on the desired range of motion of the first anti-tip wheel 32 about the pivot axis $A_3$. In some embodiments, the pivot arm 34 does not include a pivot arm stop 62. For example, the pivot arm 34 may contact the first frame member 60 (e.g., an end of the channel 64) to prevent further movement of the pivot arm 34 relative to the first frame member 60. Pivot arm stop 62 may prevent movement of the pivot arm 34 in a first direction but allow movement in a second direction opposite the first direction. Pivot arm stop 62 may be engaged with first frame member 60 when pivot arm 34 is in the first configuration.

In some embodiments, the first anti-tip wheel 32 is pivotable about pivot axis $A_3$ when the first anti-tip assembly 30 is in the first configuration. In some embodiments, the first anti-tip wheel 32 is pivotable about pivot axis $A_3$ from an extended position $P_E$ to a retracted position $P_R$ (best seen in FIG. 5). In some embodiments, the retracted position $P_R$ is rearward (e.g. closer to drive wheel 24) of the extended position $P_E$. In some embodiments, the first anti-tip wheel 32 is closer to the frame 22 when the first anti-tip wheel 32 is in the retracted position $P_R$ than when the first anti-tip wheel 32 is in the extended position $P_E$.

In some embodiments, the first anti-tip wheel 32 moves a horizontal distance $d_3$ of about 0.25 inches to about 1 inch, about 1 inch to about 2 inches, about 2 inches to about 3 inches, about 3 inches to about 4 inches, about 4 inches to about 5 inches, about 5 inches to about 6 inches, about 6 inches to about 7 inches, about 7 inches to about 8 inches, about 8 inches to about 9 inches, about 9 inches to about 10 inches, or more than 10 inches when the first anti-tip wheel 32 moves between the extended position $P_E$ and the retracted position $P_R$. In some embodiments, the first anti-tip wheel 32 is prevented from rotating about axis $A_3$ when the first anti-tip wheel 32 is in the second position. In some embodiments, the first anti-tip wheel 32 can translate along axis $A_2$ when the first anti-tip wheel 32 is in the retracted position $P_R$.

In some embodiments, the first anti-tip assembly 30 includes a first biasing element 38 (e.g., spring, piston, or elastomeric member). In some embodiments, the first biasing element 38 biases the first anti-tip wheel 32 toward the extended position $P_E$ when the first anti-tip assembly 30 is in the first configuration. In some embodiments, the first biasing element 388 is a hydraulic piston or a compressible material. In other embodiments, gravity biases the first anti-tip assembly 30 toward the first position.

In some embodiments, the first biasing element 38 is coupled to the pivot arm 34 and the frame 22 or first frame member 60. In some embodiments, the first biasing element 38 biases the pivot arm 34 such that the pivot arm stop 62 engages the first frame member 60 when the first anti-tip wheel 32 is in the extended position $P_E$.

In some embodiments, the first biasing element 38 is coupled to the pivot arm 34 and the frame 22 such that the first biasing element 38 is subject to a tensile force as the first anti-tip wheel 32 moves from the extended position $P_E$ to the retracted position $P_R$. For example, the first anti-tip wheel 32 may be positioned toward a first end of the pivot arm 34, the first biasing element may be positioned toward a second end of the pivot arm 34, and the axle 61 may be positioned between the first end and second end such that the second end of the pivot arm 34 moves away from the first frame member 60 as the first anti-tip wheel 32 moves toward the frame 22. In other embodiments, the first biasing element 38 is coupled to the pivot arm 34 and the first frame member 60 such that the first biasing element 38 is subject to a compressive force as the first anti-tip assembly moves from the extended position $P_E$ to the retracted position $P_R$. For example, the first biasing element 38 may be coupled to the pivot arm 34 between the first anti-tip wheel 32 and the axle 61 such that movement of the first anti-tip wheel 32 compresses the first biasing element 38.

In some embodiments, the first anti-tip wheel 32 is translatable along sliding axis $A_2$ independently of being pivotable about pivot axis $A_3$ when the anti-tip assembly 30 is in the first configuration. In some embodiments, the first anti-tip wheel 32 is translatable along sliding axis $A_2$ from a first position (best seen in FIG. 3) to a second position. In some embodiments, the first anti-tip wheel 32 is translatable along sliding axis $A_2$ to a maximum distance of about 0.25 inches, about 0.5 inches, about 0.75 inches, about 1 inch, about 1.5 inches, about 2 inches, about 2.5 inches, about 3 inches, about 0.25 to about 0.5 inches, about 0.5 inches to about 0.75 inches, about 0.75 inches to about 1 inch about 1 inch to about 1.5 inches, about 1.5 inches to about 2 inches, about 2 inches to about 3.5 inches, or about 2.5 inches to about 3 inches. In some embodiments, the first anti-tip wheel 32 is closer to the surface in the first position than in the second position. The first anti-tip wheel 32 may be pivotable rotatable about a rotation axis, pivotable about pivot axis $A_3$, and translatable along sliding axis $A_2$. Pivot axis $A_3$ may be offset from the rotation axis.

In some embodiments, the first anti-tip wheel 32 is biased toward the first position when the first anti-tip assembly 30 is in the first configuration. In some embodiments, a second biasing element (not shown) biases the first anti-tip wheel 32 toward the first position. In some embodiments, the second biasing element is a spring. In some embodiments, the second biasing element is a hydraulic piston or a resiliently deformable material. In some embodiments, the first anti-tip wheel 32 biased toward the first position by gravity.

In some embodiments, the second biasing element is at least partially within a housing 36. In some embodiments, the housing 36 includes an opening configured to receive the pivot arm 34. In some embodiments, the housing 36 moves relative to the pivot arm 34 as the first anti-tip wheel 32 moves from the first position to the second position. In some embodiments, second biasing element is coupled to the pivot arm 34 and an inner surface of the housing 36. In some embodiments, the second biasing element compresses as the first anti-tip wheel 32 moves from the first position to the second position. In other embodiments, the second biasing element elongates as the first anti-tip wheel 32 moves from the first position to the second position.

In some embodiments, housing 36 includes sidewall 37. In some embodiments, sidewall 37 has a pentagonal shape. In some embodiments, housing 36 includes insert 39. In some embodiments, sidewall 37 is coupled to insert 39 (e.g., via fastener, welding, or adhesive). In some embodiments, sidewall 37 is manufactured from a first material and insert 39 is manufactured from a second material. In some embodiments, the first material is different from the second material. In some embodiments, the first material is harder than the second material (e.g., as measured by a Rockwell hardness test). In some embodiments, the second material is harder than the first material. In some embodiments, the first material is steel, iron, or aluminum. In some embodiments, the housing 36 (e.g., insert 39) contacts the pivot arm 34 as the first anti-tip wheel 32 moves from the first position to the second position. In some embodiments, the second material is selected to reduce or minimize friction and/or wear between the insert 39 and the pivot arm 34 as the first anti-tip wheel 32 moves from the first position to the second position.

In some embodiments, the first anti-tip wheel 32 is biased toward the first position by the second biasing element and biased toward the extended position $P_E$ by the first biasing element 38. In some embodiments, the second biasing element is different than the first biasing element 38. In some embodiments, the first anti-tip wheel 32 is biased toward the first position and biased toward the extended position $P_E$ by a single biasing element (e.g., second biasing element or first biasing element 38). In some embodiments, the biasing force of the second biasing element is less than the biasing force of the first biasing element 38. In other embodiments, the biasing force of the second biasing element is greater than the biasing force of the first biasing element 38.

In some embodiments, the first anti-tip assembly 30 includes a second configuration. In some embodiments, the first anti-tip wheel 32 is both pivotable about the pivot axis $A_3$ and translatable along the sliding axis $A_2$ when the first anti-tip assembly 30 is in the second configuration. In some embodiments, the first anti-tip wheel 32 is pivotable about the pivot axis $A_3$ to a greater extent when the anti-tip assembly 30 is in the first configuration than when the anti-tip assembly 30 is in the second configuration.

In some embodiments, the first anti-tip assembly 30 includes a third configuration. In some embodiments, the first anti-tip wheel 32 is both pivotable about the pivot axis $A_3$ and translatable along the sliding axis $A_2$ when the first anti-tip assembly 30 is in the third configuration. In some embodiments, the first anti-tip wheel 32 is translatable along the sliding axis $A_2$ to a greater extent when the anti-tip assembly 30 is in the first configuration than when the anti-tip assembly 30 is in the third configuration.

In some embodiments, the first anti-tip assembly 30 includes a fourth configuration. In some embodiments, the first anti-tip wheel 32 is both pivotable about the pivot axis $A_3$ and translatable along the sliding axis $A_2$ when the first anti-tip assembly 30 is in the fourth configuration. In some embodiments, the first anti-tip wheel 32 is pivotable about the pivot axis $A_3$ to a greater extent when the anti-tip assembly 30 is in the first configuration than when the anti-tip assembly 30 is in the fourth configuration and the first anti-tip wheel 32 is translatable along the sliding axis $A_2$ to a greater extent when the anti-tip assembly 30 is in the first configuration than when the anti-tip assembly 30 is in the fourth configuration.

Figure 4:
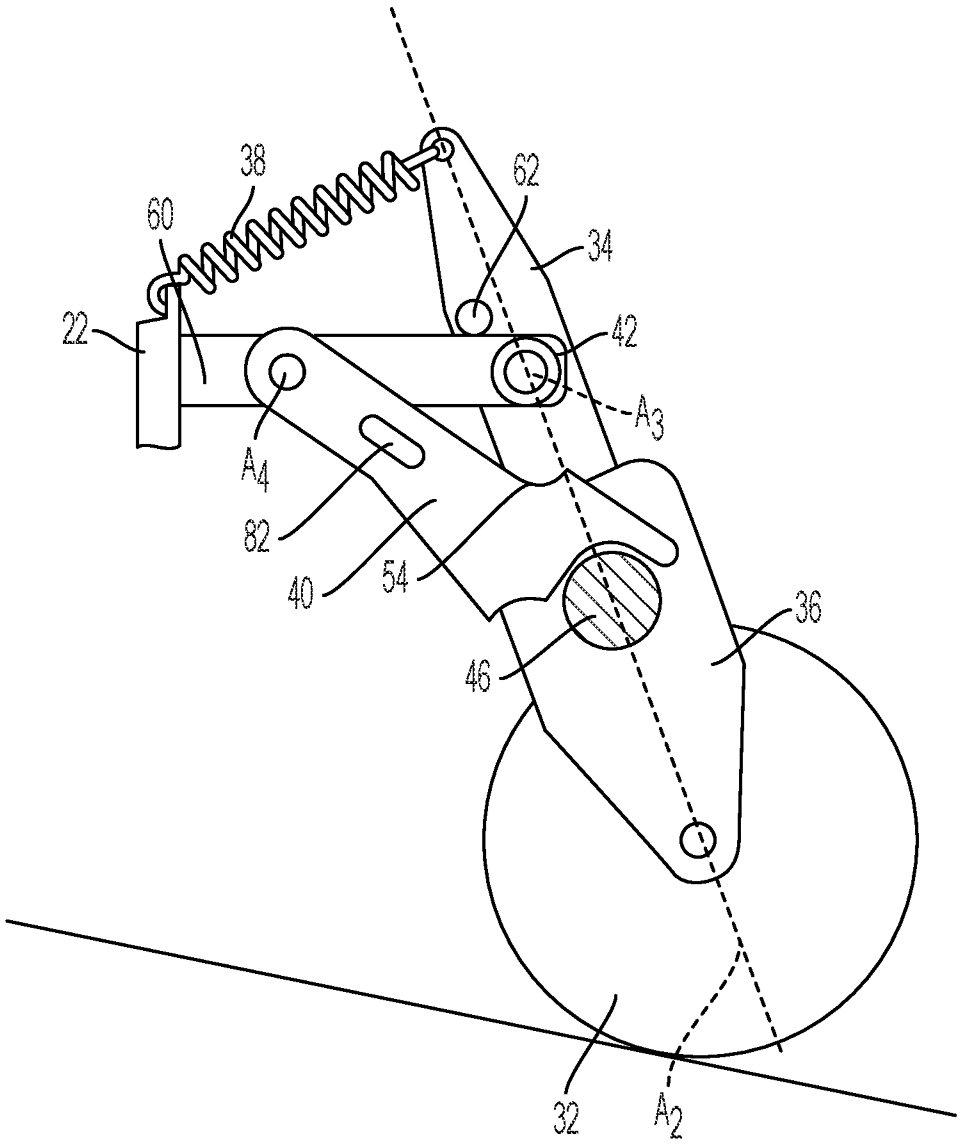
FIG. 4 is a right-side elevational view of the anti-tip assembly of FIG. 1 in a second configuration.
Figure 5:
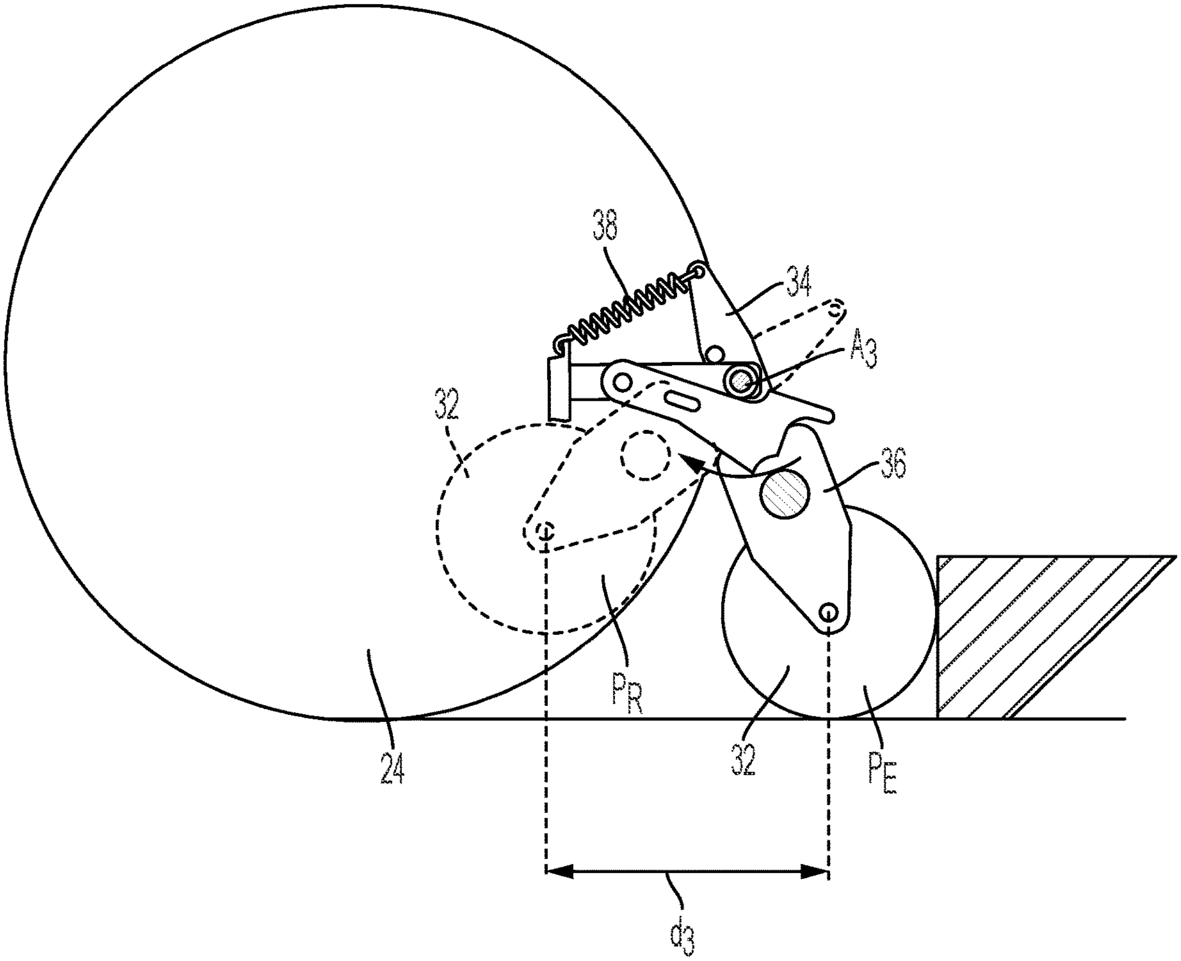
FIG. 5 is a right-side elevational view of the anti-tip assembly of FIG. 1 illustrating different positions of the first anti-tip wheel.

In some embodiments, the first anti-tip assembly 30 includes a lock 40 configured to limit movement of the first anti-tip wheel 32. In some embodiments, the lock 40 is configured to move relative to the first anti-tip wheel 32. In some embodiments, movement of the lock 40 relative to the first anti-tip wheel 32 transitions the first anti-tip assembly 30 from the first configuration to one or more of the second configuration, third configuration, or fourth configuration. In some embodiments, the lock 40 moves between an unlocked configuration (FIG. 3) and a locked configuration (FIG. 4). In some embodiments, the first anti-tip assembly 30 is in the first configuration when the lock 40 is in the unlocked configuration. In some embodiments, the first anti-tip assembly 30 is in the second configuration when the lock 40 is in the locked configuration.

In some embodiments, the lock 40 is configured to restrict at least one of translation and rotation of the first anti-tip wheel 32 when the lock 40 is in the locked configuration. In some embodiments, the first anti-tip wheel is translatable along the sliding axis $A_2$ by a shorter distance when the anti-tip lock is in the locked configuration than when the anti-tip lock is in the unlocked configuration.

In some embodiments, the lock 40 pivots about lock axis $A_4$ (best seen in FIG. 4) as the lock 40 moves between the unlocked configuration and the locked configuration. In other embodiments, the lock 40 slides, folds, expands, or translates along an axis as the lock 40 moves from the unlocked configuration to the locked configuration. In some embodiments, lock 40 is pivotably coupled to the first frame member 60 such that lock can pivot about axis $A_4$ relative to at least one of the frame 22, first frame member 60, and the first anti-tip wheel 32. In some embodiments, a lock axle 66 couples the lock 40 to the first frame member 60 (best seen in FIG. 2). In some embodiments, the lock axle 66 extends through an opening in the lock 40 and is coupled to the first frame member 60. In some embodiments, the lock axle 66 extends through an opening in one or both of the lock 40 and the first frame member 60. In some embodiments, the lock axle 66 extends through an opening in one of the lock and the first frame member 60 and is fixed to the other of the lock 40 and the first frame member 60. In some embodiments, the lock axle 66 is a threaded fastener, rod, or dowel. In some embodiments, a spacer 68 spaces the first frame member 60 from the lock 40. For example, the spacer 68 may be a washer coupled to the lock axle 66 and positioned between the first frame member 60 and the lock 40 such that the lock 40 does not contact the first frame member 60 as the lock 40 pivots relative to the first frame member 60.

In some embodiments, the frame 22 includes a first stop 42 (best seen in FIGS. 2 and 3). In some embodiments, the first stop 42 prevents movement of the lock 40 when the anti-tip assembly 30 is in the first configuration. For example, the first stop 42 may protrude away from the frame 22 such that the lock 40 contacts the first stop 42 as the lock 40 moves from the locked configuration to the unlocked configuration. In some embodiments, the first stop 42 is in the movement path of the lock 40 such that the first stop 42 limits the range of movement of the lock 40. In some embodiments, the lock 40 engages the first stop 42 when the lock 40 is in selected configurations (e.g., when the first anti-tip assembly 30 is in the first configuration). In other embodiments, the lock 40 engages the first stop 42 when the first anti-tip wheel 32 causes the lock to engage the first stop 42. For example, when the vehicle travels up an incline and the lock 40 is in the unlocked configuration, the first anti-tip wheel 32 may translate along axis $A_2$ such that a second stop 46 engages the lock 40 and moves the lock 40 into contact with the first stop 42 (best seen in FIG. 6).

In some embodiments, the first stop 42 is a post that extends substantially perpendicularly away from the frame 22 or first frame member 60. In some embodiments, the pivot axis $A_3$ extends through at least a portion of the first stop 42. In some embodiments, the first stop 42 is coaxial with the pivot axis $A_3$. In some embodiments, the first stop 42 includes a bushing 44 on a bolt that extends through the first frame member 60. In some embodiments, the first stop 42 includes a bushing 44 on a bolt that extends through the pivot arm 34. In some embodiments, the first stop 42 includes a bushing 44 on the axle 61 that extends through the first frame member 60 and the pivot arm 34.

In some embodiments, the size (e.g., the diameter) of the first stop 42 is selected based on a preferred range of motion of the pivot arm 34. For example, a bushing 44 having a relatively larger diameter will allow less range of motion of the pivot arm 34 than a relatively smaller diameter bushing. In some embodiments, the first stop 42 is manufactured from a rigid material (e.g., steel, aluminum, iron, HDPE). In other embodiments, the first stop 42 is manufactured from a flexible material (e.g., rubber, LDPE).

In some embodiments, the frame 22 includes a second stop 46 (best seen in FIGS. 2 and 3). In some embodiments, the lock 40 engages the second stop 46 when the anti-tip assembly 30 is in the second configuration. In some embodiments, the second stop 46 protrudes from the housing 36. In some embodiments, the second stop 46 protrudes away from the housing 36 such that the second stop 46 is in the path of the lock 40 and prevents movement of the housing 36 relative to the lock. In some embodiments, the lock 40 engages the second stop 46 when the first anti-tip assembly is in the second configuration. In some embodiments, the lock 40 engages the first stop 42 and the second stop 46 simultaneously. For example, when driving up an incline (best seen in FIG. 6).

In some embodiments, the second stop 46 is a post that extends substantially perpendicularly from the housing 36. In some embodiments, the second stop 46 is a bushing on a bolt that extends through a portion of the housing 36 (e.g., sidewall 37) In some embodiments, the second stop 46 is a bushing on a bolt and the bolt extends through one or both of the sidewall 37 and the insert 39. In some embodiments, the diameter of the second stop 46 is larger than the diameter of the first stop 42.

Figure 6:
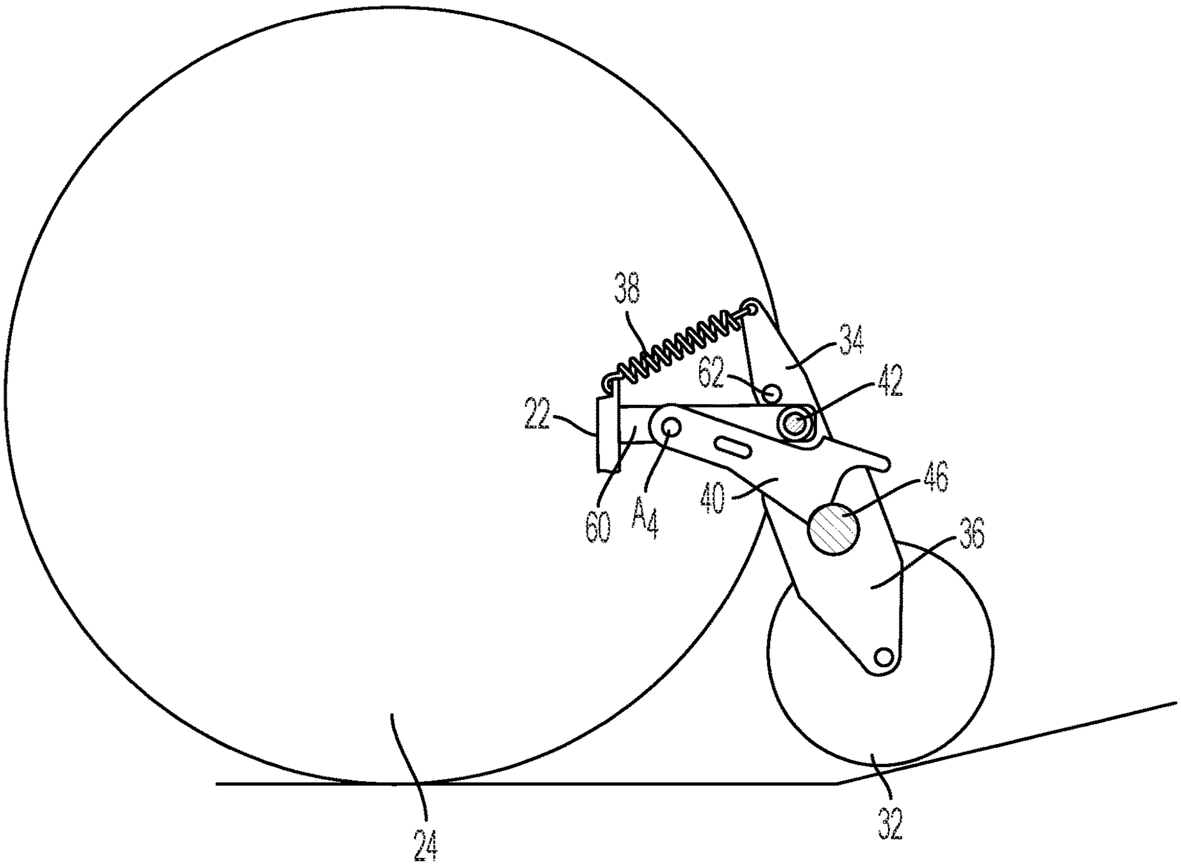
FIG. 6 is a right-side elevational view of the anti-tip assembly of FIG. 1 with the first anti-tip wheel in a second position.

In some embodiments, the lock 40 includes a first engagement surface 48 (best seen in FIG. 3). In some embodiments, the first engagement surface 48 engages the second stop 46 when the first anti-tip assembly 30 is in the first configuration and the first anti-tip wheel 32 is in the second position (FIG. 6). In some embodiments, the first engagement surface 48 is spaced from the second stop 46 when the first anti-tip assembly 30 is in the first configuration and the first anti-tip wheel 32 is in the first position. In some embodiments, the first engagement surface 48 has a concave shape. In some embodiments, the first engagement surface 48 is shaped similar to the outer surface of the second stop 46. In some embodiments, the first engagement surface 48 is defined by an arc segment of a circle. In some embodiments, the first engagement surface 48 is defined by an arc segment of a circle having a radius of about 0.25 inches to about 1 inch, about 1 inch to about 2 inches, about 2 inches to about 3 inches, about 3 inches to about 4 inches, about 4 inches to about 5 inches, about 5 inches to about 6 inches, about 6 inches to about 7 inches, about 7 inches to about 8 inches, about 8 inches to about 9 inches, or about 9 inches to about 10 inches.

In some embodiments, the lock 40 includes a second engagement surface 50 (best seen in FIG. 3). In some embodiments, the second engagement surface 50 engages the second stop 46 when the first anti-tip assembly 30 is in the second configuration. In some embodiments, the second engagement surface 50 has a concave shape. In some embodiments, the second engagement surface 50 is shaped similar to the outer surface of the second stop 46. In some embodiments, the second engagement surface 50 is defined by an arc segment of a circle. In some embodiments, the second engagement surface 50 is defined by an arc segment of a circle having a radius of about 0.25 inches to about 1 inch, about 1 inch to about 2 inches, about 2 inches to about 3 inches, about 3 inches to about 4 inches, about 4 inches to about 5 inches, about 5 inches to about 6 inches, about 6 inches to about 7 inches, about 7 inches to about 8 inches, about 8 inches to about 9 inches, or about 9 inches to about 10 inches. In some embodiments, the first engagement surface 48 and the second engagement surface 50 are each defined by an arcuate segment of a circle. In some embodiments, the first engagement surface 48 and the second engagement surface 50 are each defined by an arcuate segment of a circle having the same radius.

In some embodiments, the first engagement surface 48 engages the second stop 46 when the first anti-tip assembly 30 is in the first configuration and the second engagement surface 50 engages the second stop 46 when the first anti-tip assembly 30 is in the second configuration.

In some embodiments, the lock 40 includes a flange 52 (best seen in FIG. 3). In some embodiments, the flange 52 prevents misalignment of the lock 40 and the second stop 46. For example, the flange 52 may extend further than the second engagement surface 50 to prevent over rotation of the lock 40 as the lock 40 moves from the unlocked configuration to the locked configuration. In some embodiments, the flange 52 is adjacent the second engagement surface 50. In some embodiments, a lower surface of the flange 52 is defined by a generally straight line. In some embodiments, the lower surface of the flange 52 is defined by a generally straight line tangent to the second engagement surface 50.

In some embodiments, the lock 40 includes a third engagement surface 54 (best seen in FIG. 4). In some embodiments, the third engagement surface 54 is configured to engage the first stop 42 when the first anti-tip assembly 30 is in the first configuration. In some embodiments, the third engagement surface 54 has a concave shape. In some embodiments, the third engagement surface 54 is shaped similar to the outer surface of the first stop 42. In some embodiments, the third engagement surface 54 is defined by an arc segment of a circle. In some embodiments, the third engagement surface 54 is defined by an arc segment of a circle having a radius of about 0.25 inches to about 1 inch, about 1 inch to about 2 inches, about 2 inches to about 3 inches, about 3 inches to about 4 inches, about 4 inches to about 5 inches, about 5 inches to about 6 inches, about 6 inches to about 7 inches, about 7 inches to about 8 inches, about 8 inches to about 9 inches, or about 9 inches to about 10 inches. In some embodiments, the third engagement surface 54 has a shape other than arcuate (e.g., straight or angled).

In some embodiments, the third engagement surface 54 is spaced from the first stop 42 when the first anti-tip assembly 30 is in the first configuration and the first anti-tip wheel 30 is in the first position. In some embodiments, movement of the first anti-tip wheel 32 from the first position toward the second position causes the second stop 46 to engage the first engagement surface 48. In some embodiments, further movement of the first anti-tip wheel 32 toward the second position moves the lock such that the first stop 42 engages the third engagement surface 54 (best seen in FIG. 6).

In some embodiments, the first anti-tip assembly includes an actuator 56 configured to move the lock 40 between the unlocked configuration and the unlocked configuration. In some embodiments, the actuator 56 is an electric motor. In other embodiments, the actuator 56 is a hydraulic piston, manually actuated lever, or linear actuator. In some embodiments, the actuator 56 acts directly on the lock 40 to move the lock between the unlocked configuration and the locked configuration. In other embodiments, there is an intermediate connector between the actuator 56 and the lock 40.

Figure 9:
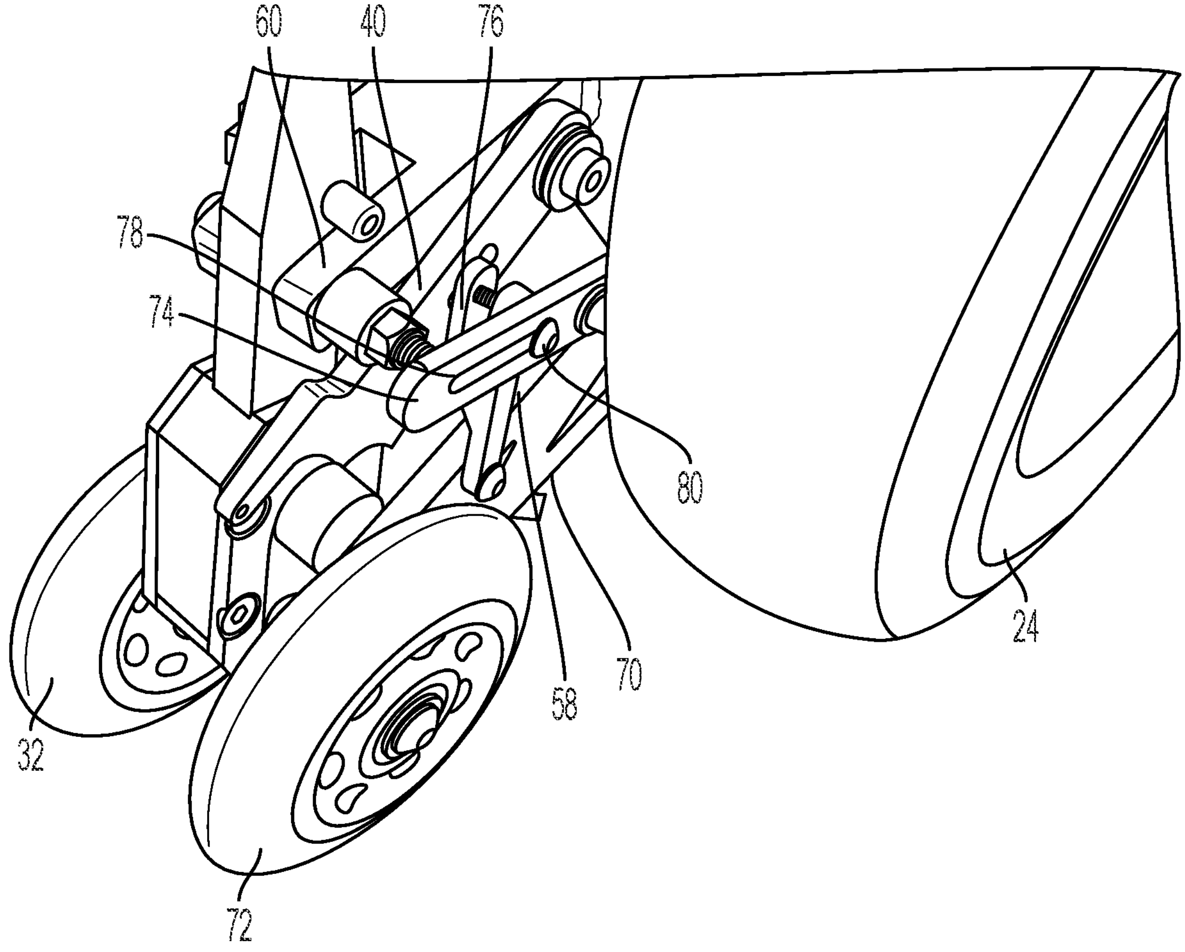
FIG. 9 is a perspective view of the anti-tip assembly of FIG. 1 in a first configuration.
Figure 10:
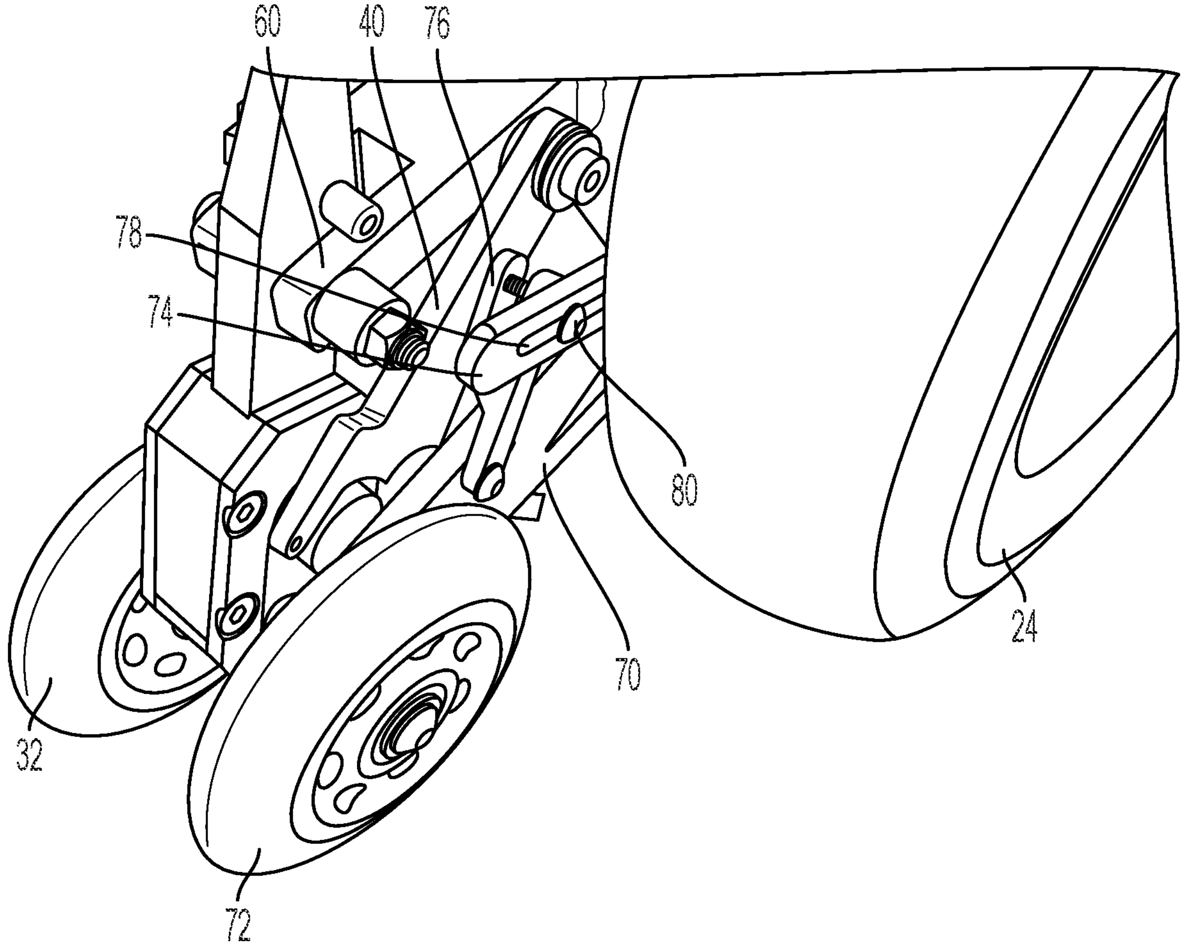
FIG. 10 is a perspective view of the anti-tip assembly of FIG. 1 in a second configuration.

In some embodiments, the first anti-tip assembly 30 includes a linkage assembly 58 (best seen in FIG. 9) configured to move the lock 40 from the unlocked configuration (FIG. 9) to the locked configuration (FIG. 10). For example, the linkage assembly 58 may be coupled to the actuator 56 and the lock 40 such that the actuator 56 moves (e.g., rotates or translates) the linkage assembly 58 which then moves the lock 40 from the unlocked configuration to the locked configuration.

Figure 7:
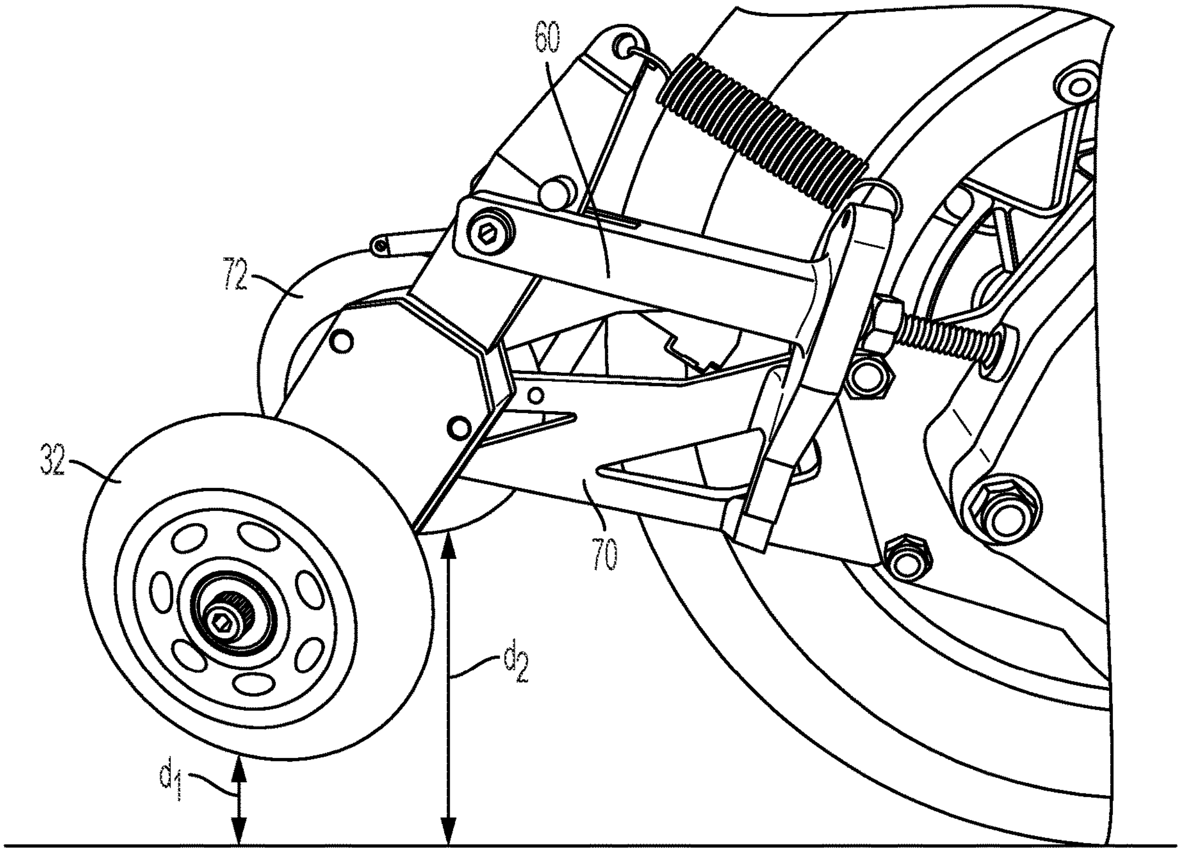
FIG. 7 is a left-side elevational view of the anti-tip assembly of FIG. 1.
Figure 8:
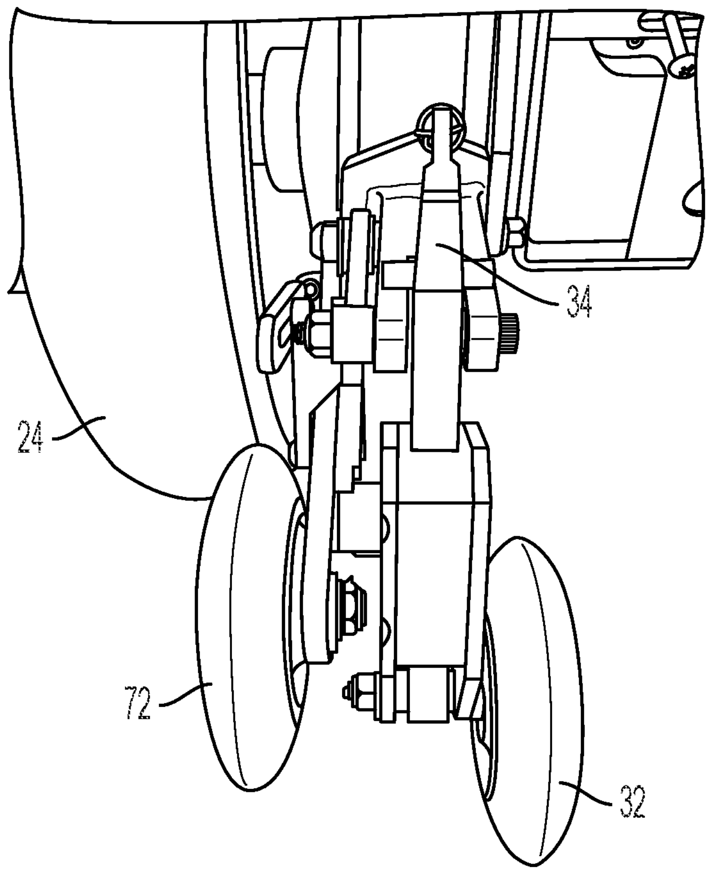
FIG. 8 is a front elevational view of the anti-tip assembly of FIG. 1.

In some embodiments, the frame 22 includes a second frame member 70 (best seen in FIG. 7). In some embodiments, the linkage assembly 58 is coupled to the first frame member 60, the second frame member 70, and the lock 40. In some embodiments, the second frame member 70 is fixed relative to the frame 22. In some embodiments, the second frame member is coupled to the frame 22 (e.g., by welding, adhesive, rivet, or threaded fastener). In some embodiments, the second frame member 70 is positioned closer to the ground surface than the first frame member 60.

In some embodiments, the linkage assembly 58 includes a first link 74 and a second link 76 (best seen in FIGS. 9 and 10). In some embodiments, the first link 74 is coupled to the actuator 56 and the second link 76. In some embodiments, the second link 76 is coupled to the second frame member 70, the first link 74, and the lock 40. In some embodiments, the first link 74 includes a groove 78 configured to receive a pin 80. In some embodiments, the pin 80 is configured to move relative to the groove 78 as the actuator moves the first link 74. In some embodiments, the pin 80 is coupled to the second link 76. In some embodiments, the pin 80 is fixed relative to the second link 76.

In some embodiments, movement of the pin 80 within the groove 78 is configured to cause movement of the second link 76 relative to the second frame member 70. For example, a wall (e.g., a sidewall or end wall) of the groove 78 may apply a force to the pin 80 as the actuator 56 moves the first link 74. In some embodiments, the force on the pin 80 causes the second link 76 to move. In some embodiments, the second link 76 is pivotably coupled to the second frame member 70 such that the second link 76 pivots relative to the second frame member 70 as the actuator 56 moves the first link 74. In some embodiments, the actuator 56 moves the first link 74 along a linear axis and the second link 76 pivots as the first link 74 moves linearly.

In some embodiments, the lock 40 includes lock groove 82 (best seen in FIG. 4) configured to receive the pin 80. In some embodiments, the pin 80 is configured to move relative to the lock groove 82 as the actuator 56 moves the first link 74. In some embodiments, movement of the pin 80 within the lock groove 82 is configured to move the lock 40 between the locked configuration and the unlocked configuration. For example, as the second link 76 pivots relative to the second frame member 70, the pin 80 may engage a sidewall of the lock groove 82, thereby causing the lock 40 to pivot relative to the first frame member 60. In some embodiments, the lock moves between the locked configuration and the unlocked configuration as the lock 40 pivots relative to the first frame member 60.

In some embodiments, the first anti-tip assembly 30 includes a second anti-tip wheel 72. In some embodiments, the second anti-tip wheel 72 is coupled to the second frame member 70. In some embodiments, the second anti-tip wheel 72 is positioned between the drive wheel 24 and the first anti-tip wheel 32 when viewed from the front of the vehicle 20 (best seen in FIG. 8).

In some embodiments, the second anti-tip wheel 72 is substantially fixed against translation relative to frame 22. In some embodiments, the second anti-tip wheel 72 is substantially pivotably fixed relative to frame. In some embodiments, the second anti-tip wheel 72 is substantially fixed against translating and pivoting relative to frame. In some embodiments, the second anti-tip wheel 72 is coupled to the second frame member 70. In some embodiments, the second anti-tip wheel 72 is rotatably coupled to the second frame member 70.

In some embodiments, the first anti-tip wheel 32 may be positioned at a first distance $d_1$ off the ground and the second anti-tip wheel 72 may be positioned at a second distance $d_2$ (best seen in FIG. 5) off the ground when the motorized vehicle is in a normal operating mode. In some embodiments, the normal operating mode is characterized by a travel along substantially level ground. In some embodiments, the first distance $d_1$ off the ground is less than the second distance $d_2$ off the ground. In some embodiments, the first anti-tip wheel 32 is pivotable to a third distance off the ground that is at least as long as the second distance $d_2$ off the ground.

In some embodiments, the vehicle 20 includes a controller configured to send an actuator signal to the actuator 56 to move the lock 40 between the locked configuration and the unlocked configuration. In some embodiments, the controller is configured to receive user input (e.g., through a switch, button, head motion sensor, or sip-and-puff switch) to cause the controller to send the actuator signal.

In some embodiments, the vehicle 20 includes a condition sensor configured to sense a condition of the vehicle 20. In some embodiments, the condition sensor is configured to send a condition signal to the controller. In some embodiments, the condition signal is indicative of the sensed condition of the vehicle 20. In some embodiments, the actuator signal is based on the condition signal. In some embodiments, the condition sensor is configured to sense at least one of tilt, acceleration, deceleration, velocity, and combinations thereof. In some embodiments, the condition sensor is at least one of a tilt sensor, an accelerometer, a velocity sensor, a gyroscope, a position sensor, a global positioning system (GPS) sensor, and combinations thereof.

In some embodiments, the vehicle 20 includes a second anti-tip assembly (not shown). In some embodiments, the second anti-tip assembly is identical to the first anti-tip assembly 30. In some embodiments, the second anti-tip assembly operates independently of the first anti-tip assembly 30. In some embodiments, the first anti-tip assembly 30 is coupled to a first side (e.g., left side) of the vehicle 20 and the second anti-tip assembly is coupled to a second side (e.g., right side) of the vehicle 20.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. The words "right", "left", "lower" and "upper" designate directions in the drawings to which reference is made. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

We claim:

1. A motorized vehicle comprising:

a frame;

a drive wheel coupled to the frame;

a motor operatively coupled to the drive wheel; and an anti-tip assembly having a first anti-tip wheel, the anti-tip assembly having a first configuration wherein the first anti-tip wheel is both pivotable about a pivot axis relative to the frame and translatable along a sliding axis, wherein the anti-tip assembly has a second configuration wherein the first anti-tip wheel is both pivotable about the pivot axis and translatable along the sliding axis, the first anti-tip wheel being pivotable about the pivot axis to a greater extent in the first configuration than in the second configuration.

2. The motorized vehicle of claim 1, wherein the first anti-tip wheel is coupled to a pivot arm disposed about the sliding axis, the pivot arm coupled to the frame at the pivot axis.

3. The motorized vehicle of claim 1, wherein the first anti-tip wheel is rotatable about a rotation axis, pivotable about a pivot axis relative to the frame, and translatable along a sliding axis.

4. The motorized vehicle of claim 1, wherein, in the first configuration, the first anti-tip wheel is translatable along the sliding axis independently of being pivotable about the pivot axis.

5. The motorized vehicle of claim 1, wherein, in the first configuration, the first anti-tip wheel is translatable along the sliding axis from a first position to a second position.

6. The motorized vehicle of claim 5 wherein in the first configuration, the first anti-tip wheel is translatable along the sliding axis to a maximum sliding distance of approximately 0.75 inches.

7. The motorized vehicle of claim 5, wherein, in the first configuration, the first anti-tip wheel is biased toward the first position.

8. The motorized vehicle of claim 5, wherein, in the first configuration, the first anti-tip wheel is pivotable about the pivot axis from an extended position to a retracted position, the retracted position being rearward of the extended position.

9. The motorized vehicle of claim 8, wherein the first anti-tip wheel is coupled to a pivot arm disposed about the sliding axis, the pivot arm coupled to the frame at the pivot axis and the motorized vehicle further comprises a biasing element coupled to the pivot arm and to the frame wherein, in the first configuration, the biasing element is configured to bias the first anti-tip wheel toward the extended position.

10. The motorized vehicle of claim 8, wherein the first anti-tip wheel is biased toward the first configuration by a first biasing element and is biased toward the extended position by a second biasing element that is different from the first biasing element.

11. The motorized vehicle of claim 10, wherein a biasing force of the first biasing element is less than a biasing force of the second biasing element.

12. The motorized vehicle of claim 1 wherein the anti-tip assembly has a configuration wherein the first anti-tip wheel is both pivotable about the pivot axis and translatable along the sliding axis, the first anti-tip wheel being translatable along the sliding axis to a greater distance in the first configuration than in the configuration.

13. The motorized vehicle of claim 1 wherein the anti-tip assembly has a configuration wherein the first anti-tip wheel is both pivotable about the pivot axis and translatable along the sliding axis, the first anti-tip wheel being pivotable about the pivot axis to a greater extent in the first configuration than in the configuration and translatable along the sliding axis to a greater extent in the first configuration than the configuration.

14. The motorized vehicle of claim 1 wherein the anti-tip assembly comprises a second anti-tip wheel which is substantially fixed against translation and pivot relative to frame.

15. The motorized vehicle of claim 14, wherein when the motorized vehicle is in a normal operating mode characterized by a travel along substantially level ground, the first anti-tip wheel is positioned at a first distance off a ground surface and the second anti-tip wheel is positioned at a second distance off the ground surface wherein the first distance off the ground surface is less than the second distance off the ground surface.

16. The motorized vehicle of claim 15 wherein the first anti-tip wheel is pivotable to a third distance off the ground surface that is at least as long as the second distance off the ground surface.

17. The motorized vehicle of claim 1 further comprising an anti-tip lock that is configured move between a locked configuration and an unlocked configuration wherein, in the locked configuration, the anti-tip assembly is in the second configuration.

18. The motorized vehicle of claim 17 wherein the anti-tip lock is configured to pivot from the unlocked configuration to the locked configuration, wherein the anti-tip lock is configured to engage a first stop coupled to the frame when the anti-tip assembly is in the first configuration, and wherein the anti-tip lock is configured to engage a second stop coupled to first anti-tip wheel when the anti-tip assembly is in the second configuration.

19. The motorized vehicle of claim 17 wherein the anti-tip lock is configured to restrict at least one of translation and rotation of the first anti-tip wheel when the anti-tip lock is in the locked configuration.

20. The motorized vehicle of claim 19 wherein, the first anti-tip wheel is translatable along the sliding axis by a shorter distance when the anti-tip lock is in the locked configuration than when the anti-tip lock is in the unlocked configuration.

21. The motorized vehicle of claim 17, further comprising a controller configured to cause an actuator signal to be sent to an actuator to move the anti-tip lock between the locked configuration and the unlocked configuration.

22. The motorized vehicle of claim 21, further comprising a condition sensor configured to sense a condition of the motorized vehicle, wherein the condition sensor is configured to send a condition signal to the controller indicative of the sensed condition of the motorized vehicle and the actuator signal is based on the condition signal.

23. The motorized vehicle of claim 22 wherein the condition sensor is configured to sense at least one of tilt, acceleration, deceleration, velocity and combinations thereof.

24. The motorized vehicle of claim 22 wherein the condition sensor comprises at least one of a tilt sensor, an accelerometer, a velocity sensor, a gyroscope, a position sensor, a gps sensor and combinations thereof.

25. The motorized vehicle of claim 15, wherein the second anti-tip wheel is positioned between the drive wheel and the first anti-tip wheel when viewed from a front of the motorized vehicle.

26. The motorized vehicle of claim 1, wherein the anti-tip assembly comprises a first anti-tip assembly and the motorized vehicle further comprises:

a second anti-tip assembly identical to the first anti-tip assembly that operates independently of the first anti-tip assembly.

27. The motorized vehicle of claim 1, wherein sliding axis is oriented at an acute angle to a line that is normal to a flat level ground surface when the motorized vehicle is operating on the flat level ground surface.

28. The motorized vehicle of claim 27 wherein the acute angle is configured to prevent the first anti-tip wheel from pivoting when the first anti-tip wheel engages a ground surface in response to the motorized vehicle traveling on a downslope.

29. The motorized vehicle of claim 27, wherein the acute angle is configured to allow the first anti-tip wheel to pivot when the first anti-tip wheel engages an obstruction in a path of the motorized vehicle.

30. The motorized vehicle of claim 27, wherein the acute angle is about 20 degrees.

31. The motorized vehicle of claim 28 wherein a threshold level of the downslope is in a range of 10 degrees to 25 degrees.

32. The motorized vehicle of claim 27, wherein the acute angle is within 5 degrees of the smallest angle such that, if selected as the acute angle, the drive wheel would have a reduced traction with the ground surface when the first anti-tip wheel engages an obstruction in a path of the motorized vehicle.

33. The motorized vehicle of claim 1 wherein the motorized vehicle has a longitudinal axis, and a centerline of the drive wheel is separated from a centerline of the first anti-tip wheel along the longitudinal axis by a distance of approximately 9 inches.

34. A motorized vehicle comprising:

a frame;

a drive wheel coupled to the frame;

a motor operatively coupled to the drive wheel; and an anti-tip assembly having a first anti-tip wheel, the anti-tip assembly having a first configuration wherein the first anti-tip wheel is both pivotable about a pivot axis relative to the frame and translatable along a sliding axis, wherein the first anti-tip wheel is rotatable about a rotation axis, pivotable about a pivot axis relative to the frame, and translatable along a sliding axis.

35. The motorized vehicle of claim 34, wherein the first anti-tip wheel is coupled to a pivot arm disposed about the sliding axis, the pivot arm coupled to the frame at the pivot axis.

36. The motorized vehicle of claim 34, wherein, in the first configuration, the first anti-tip wheel is translatable along the sliding axis independently of being pivotable about the pivot axis.

37. The motorized vehicle of claim 34, wherein, in the first configuration, the first anti-tip wheel is translatable along the sliding axis from a first position to a second position.

38. The motorized vehicle of claim 37 wherein in the first configuration, the first anti-tip wheel is translatable along the sliding axis to a maximum sliding distance of approximately 0.75 inches.

39. The motorized vehicle of claim 37, wherein, in the first configuration, the first anti-tip wheel is biased toward the first position.

40. The motorized vehicle of claim 37, wherein, in the first configuration, the first anti-tip wheel is pivotable about the pivot axis from an extended position to a retracted position, the retracted position being rearward of the extended position.

41. The motorized vehicle of claim 40, wherein the first anti-tip wheel is coupled to a pivot arm disposed about the sliding axis, the pivot arm coupled to the frame at the pivot axis and the motorized vehicle further comprises a biasing element coupled to the pivot arm and to the frame wherein, in the first configuration, the biasing element is configured to bias the first anti-tip wheel toward the extended position.

42. The motorized vehicle of claim 40, wherein the first anti-tip wheel is biased toward the first configuration by a first biasing element and is biased toward the extended position by a second biasing element that is different from the first biasing element.

43. The motorized vehicle of claim 42, wherein a biasing force of the first biasing element is less than a biasing force of the second biasing element.

44. The motorized vehicle of claim 34 wherein the anti-tip assembly has a configuration wherein the first anti-tip wheel is both pivotable about the pivot axis and translatable along the sliding axis, the first anti-tip wheel being translatable along the sliding axis to a greater distance in the first configuration than in the configuration.

45. The motorized vehicle of claim 34 wherein the anti-tip assembly has a configuration wherein the first anti-tip wheel is both pivotable about the pivot axis and translatable along the sliding axis, the first anti-tip wheel being pivotable about the pivot axis to a greater extent in the first configuration than in the configuration and translatable along the sliding axis to a greater extent in the first configuration than the configuration.

46. The motorized vehicle of claim 34 wherein the anti-tip assembly comprises a second anti-tip wheel which is substantially fixed against translation and pivot relative to frame.

47. The motorized vehicle of claim 46, wherein when the motorized vehicle is in a normal operating mode characterized by a travel along substantially level ground, the first anti-tip wheel is positioned at a first distance off a ground surface and the second anti-tip wheel is positioned at a second distance off the ground surface wherein the first distance off the ground surface is less than the second distance off the ground surface.

48. The motorized vehicle of claim 47 wherein the first anti-tip wheel is pivotable to a third distance off the ground surface that is at least as long as the second distance off the ground surface.

49. The motorized vehicle of claim 34, wherein the anti-tip assembly has a second configuration wherein the first anti-tip wheel is both pivotable about the pivot axis and translatable along the sliding axis, the first anti-tip wheel being pivotable about the pivot axis to a greater extent in the first configuration than in the second configuration, and further comprising an anti-tip lock that is configured move between a locked configuration and an unlocked configuration wherein, in the locked configuration, the anti-tip assembly is in the second configuration.

50. The motorized vehicle of claim 49 wherein the anti-tip lock is configured to pivot from the unlocked configuration to the locked configuration, wherein the anti-tip lock is configured to engage a first stop coupled to the frame when the anti-tip assembly is in the first configuration, and wherein the anti-tip lock is configured to engage a second stop coupled to first anti-tip wheel when the anti-tip assembly is in the second configuration.

51. The motorized vehicle of claim 49 wherein the anti-tip lock is configured to restrict at least one of translation and rotation of the first anti-tip wheel when the anti-tip lock is in the locked configuration.

52. The motorized vehicle of claim 51 wherein, the first anti-tip wheel is translatable along the sliding axis by a shorter distance when the anti-tip lock is in the locked configuration than when the anti-tip lock is in the unlocked configuration.

53. The motorized vehicle of claim 49, further comprising a controller configured to cause an actuator signal to be sent to an actuator to move the anti-tip lock between the locked configuration and the unlocked configuration.

54. The motorized vehicle of claim 53, further comprising a condition sensor configured to sense a condition of the motorized vehicle, wherein the condition sensor is configured to send a condition signal to the controller indicative of the sensed condition of the motorized vehicle and the actuator signal is based on the condition signal.

55. The motorized vehicle of claim 54 wherein the condition sensor is configured to sense at least one of tilt, acceleration, deceleration, velocity and combinations thereof.

56. The motorized vehicle of claim 54 wherein the condition sensor comprises at least one of a tilt sensor, an accelerometer, a velocity sensor, a gyroscope, a position sensor, a gps sensor and combinations thereof.

57. The motorized vehicle of claim 47, wherein the second anti-tip wheel is positioned between the drive wheel and the first anti-tip wheel when viewed from a front of the motorized vehicle.

58. The motorized vehicle of claim 34, wherein the anti-tip assembly comprises a first anti-tip assembly and the motorized vehicle further comprises:

a second anti-tip assembly identical to the first anti-tip assembly that operates independently of the first anti-tip assembly.

59. The motorized vehicle of claim 34, wherein sliding axis is oriented at an acute angle to a line that is normal to a flat level ground surface when the motorized vehicle is operating on the flat level ground surface.

60. The motorized vehicle of claim 59 wherein the acute angle is configured to prevent the first anti-tip wheel from pivoting when the first anti-tip wheel engages a ground surface in response to the motorized vehicle traveling on a downslope.

61. The motorized vehicle of claim 59, wherein the acute angle is configured to allow the first anti-tip wheel to pivot when the first anti-tip wheel engages an obstruction in a path of the motorized vehicle.

62. The motorized vehicle of claim 59, wherein the acute angle is about 20 degrees.

63. The motorized vehicle of claim 60 wherein a threshold level of the downslope is in a range of 10 degrees to 25 degrees.

64. The motorized vehicle of claim 59, wherein the acute angle is within 5 degrees of the smallest angle such that, if selected as the acute angle, the drive wheel would have a reduced traction with the ground surface when the first anti-tip wheel engages an obstruction in a path of the motorized vehicle.

65. The motorized vehicle of claim 34 wherein the motorized vehicle has a longitudinal axis, and a centerline of the drive wheel is separated from a centerline of the first anti-tip wheel along the longitudinal axis by a distance of approximately 9 inches.

66. A motorized vehicle comprising:

a frame;

a drive wheel coupled to the frame;

a motor operatively coupled to the drive wheel; and an anti-tip assembly having a first anti-tip wheel, the anti-tip assembly having a first configuration wherein the first anti-tip wheel is both pivotable about a pivot axis relative to the frame and translatable along a sliding axis, wherein, in the first configuration, the first anti-tip wheel is translatable along the sliding axis from a first position to a second position, and wherein, in the first configuration, the first anti-tip wheel is pivotable about the pivot axis from an extended position to a retracted position, the retracted position being rearward of the extended position.

67. The motorized vehicle of claim 66, wherein the first anti-tip wheel is coupled to a pivot arm disposed about the sliding axis, the pivot arm coupled to the frame at the pivot axis.

68. The motorized vehicle of claim 66, wherein, in the first configuration, the first anti-tip wheel is translatable along the sliding axis independently of being pivotable about the pivot axis.

69. The motorized vehicle of claim 66 wherein in the first configuration, the first anti-tip wheel is translatable along the sliding axis to a maximum sliding distance of approximately 0.75 inches.

70. The motorized vehicle of claim 66, wherein, in the first configuration, the first anti-tip wheel is biased toward the first position.

71. The motorized vehicle of claim 66, wherein the first anti-tip wheel is coupled to a pivot arm disposed about the sliding axis, the pivot arm coupled to the frame at the pivot axis and the motorized vehicle further comprises a biasing element coupled to the pivot arm and to the frame wherein, in the first configuration, the biasing element is configured to bias the first anti-tip wheel toward the extended position.

72. The motorized vehicle of claim 66, wherein the first anti-tip wheel is biased toward the first configuration by a first biasing element and is biased toward the extended position by a second biasing element that is different from the first biasing element.

73. The motorized vehicle of claim 72, wherein a biasing force of the first biasing element is less than a biasing force of the second biasing element.

74. The motorized vehicle of claim 66 wherein the anti-tip assembly has a configuration wherein the first anti-tip wheel is both pivotable about the pivot axis and translatable along the sliding axis, the first anti-tip wheel being translatable along the sliding axis to a greater distance in the first configuration than in the configuration.

75. The motorized vehicle of claim 66 wherein the anti-tip assembly has a configuration wherein the first anti-tip wheel is both pivotable about the pivot axis and translatable along the sliding axis, the first anti-tip wheel being pivotable about the pivot axis to a greater extent in the first configuration than in the configuration and translatable along the sliding axis to a greater extent in the first configuration than the configuration.

76. The motorized vehicle of claim 66 wherein the anti-tip assembly comprises a second anti-tip wheel which is substantially fixed against translation and pivot relative to frame.

77. The motorized vehicle of claim 76, wherein when the motorized vehicle is in a normal operating mode characterized by a travel along substantially level ground, the first anti-tip wheel is positioned at a first distance off a ground surface and the second anti-tip wheel is positioned at a second distance off the ground surface wherein the first distance off the ground surface is less than the second distance off the ground surface.

78. The motorized vehicle of claim 77 wherein the first anti-tip wheel is pivotable to a third distance off the ground surface that is at least as long as the second distance off the ground surface.

79. The motorized vehicle of claim 66, wherein the anti-tip assembly has a second configuration wherein the first anti-tip wheel is both pivotable about the pivot axis and translatable along the sliding axis, the first anti-tip wheel being pivotable about the pivot axis to a greater extent in the first configuration than in the second configuration, and further comprising an anti-tip lock that is configured move between a locked configuration and an unlocked configuration wherein, in the locked configuration, the anti-tip assembly is in the second configuration.

80. The motorized vehicle of claim 79 wherein the anti-tip lock is configured to pivot from the unlocked configuration to the locked configuration, wherein the anti-tip lock is configured to engage a first stop coupled to the frame when the anti-tip assembly is in the first configuration, and wherein the anti-tip lock is configured to engage a second stop coupled to first anti-tip wheel when the anti-tip assembly is in the second configuration.

81. The motorized vehicle of claim 79 wherein the anti-tip lock is configured to restrict at least one of translation and rotation of the first anti-tip wheel when the anti-tip lock is in the locked configuration.

82. The motorized vehicle of claim 81 wherein, the first anti-tip wheel is translatable along the sliding axis by a shorter distance when the anti-tip lock is in the locked configuration than when the anti-tip lock is in the unlocked configuration.

83. The motorized vehicle of claim 79, further comprising a controller configured to cause an actuator signal to be sent to an actuator to move the anti-tip lock between the locked configuration and the unlocked configuration.

84. The motorized vehicle of claim 83, further comprising a condition sensor configured to sense a condition of the motorized vehicle, wherein the condition sensor is configured to send a condition signal to the controller indicative of the sensed condition of the motorized vehicle and the actuator signal is based on the condition signal.

85. The motorized vehicle of claim 84 wherein the condition sensor is configured to sense at least one of tilt, acceleration, deceleration, velocity and combinations thereof.

86. The motorized vehicle of claim 84 wherein the condition sensor comprises at least one of a tilt sensor, an accelerometer, a velocity sensor, a gyroscope, a position sensor, a gps sensor and combinations thereof.

87. The motorized vehicle of claim 77, wherein the second anti-tip wheel is positioned between the drive wheel and the first anti-tip wheel when viewed from a front of the motorized vehicle.

88. The motorized vehicle of claim 66, wherein the anti-tip assembly comprises a first anti-tip assembly and the motorized vehicle further comprises:

a second anti-tip assembly identical to the first anti-tip assembly that operates independently of the first anti-tip assembly.

89. The motorized vehicle of claim 66, wherein sliding axis is oriented at an acute angle to a line that is normal to a flat level ground surface when the motorized vehicle is operating on the flat level ground surface.

90. The motorized vehicle of claim 89 wherein the acute angle is configured to prevent the first anti-tip wheel from pivoting when the first anti-tip wheel engages a ground surface in response to the motorized vehicle traveling on a downslope.

91. The motorized vehicle of claim 89, wherein the acute angle is configured to allow the first anti-tip wheel to pivot when the first anti-tip wheel engages an obstruction in a path of the motorized vehicle.

92. The motorized vehicle of claim 89, wherein the acute angle is about 20 degrees.

93. The motorized vehicle of claim 90 wherein a threshold level of the downslope is in a range of 10 degrees to 25 degrees.

94. The motorized vehicle of claim 89, wherein the acute angle is within 5 degrees of the smallest angle such that, if selected as the acute angle, the drive wheel would have a reduced traction with the ground surface when the first anti-tip wheel engages an obstruction in a path of the motorized vehicle.

95. The motorized vehicle of claim 66 wherein the motorized vehicle has a longitudinal axis, and a centerline of the drive wheel is separated from a centerline of the first anti-tip wheel along the longitudinal axis by a distance of approximately 9 inches.

96. A motorized vehicle comprising:

a frame;

a drive wheel coupled to the frame;

a motor operatively coupled to the drive wheel; and an anti-tip assembly having a first anti-tip wheel, the anti-tip assembly having a first configuration wherein the first anti-tip wheel is both pivotable about a pivot axis relative to the frame and translatable along a sliding axis, wherein the anti-tip assembly has a configuration wherein the first anti-tip wheel is both pivotable about the pivot axis and translatable along the sliding axis, the first anti-tip wheel being translatable along the sliding axis to a greater distance in the first configuration than in the configuration.

97. The motorized vehicle of claim 96, wherein the first anti-tip wheel is coupled to a pivot arm disposed about the sliding axis, the pivot arm coupled to the frame at the pivot axis.

98. The motorized vehicle of claim 96, wherein, in the first configuration, the first anti-tip wheel is translatable along the sliding axis independently of being pivotable about the pivot axis.

99. The motorized vehicle of claim 96, wherein, in the first configuration, the first anti-tip wheel is translatable along the sliding axis from a first position to a second position.

100. The motorized vehicle of claim 99 wherein in the first configuration, the first anti-tip wheel is translatable along the sliding axis to a maximum sliding distance of approximately 0.75 inches.

101. The motorized vehicle of claim 99, wherein, in the first configuration, the first anti-tip wheel is biased toward the first position.

102. The motorized vehicle of claim 99, wherein, in the first configuration, the first anti-tip wheel is pivotable about the pivot axis from an extended position to a retracted position, the retracted position being rearward of the extended position, and wherein the first anti-tip wheel is coupled to a pivot arm disposed about the sliding axis, the pivot arm coupled to the frame at the pivot axis and the motorized vehicle further comprises a biasing element coupled to the pivot arm and to the frame wherein, in the first configuration, the biasing element is configured to bias the first anti-tip wheel toward the extended position.

103. The motorized vehicle of claim 99, wherein, in the first configuration, the first anti-tip wheel is pivotable about the pivot axis from an extended position to a retracted position, the retracted position being rearward of the extended position, and wherein the first anti-tip wheel is biased toward the first configuration by a first biasing element and is biased toward the extended position by a second biasing element that is different from the first biasing element.

104. The motorized vehicle of claim 103, wherein a biasing force of the first biasing element is less than a biasing force of the second biasing element.

105. The motorized vehicle of claim 96 wherein the anti-tip assembly has a configuration wherein the first anti-tip wheel is both pivotable about the pivot axis and translatable along the sliding axis, the first anti-tip wheel being pivotable about the pivot axis to a greater extent in the first configuration than in the configuration and translatable along the sliding axis to a greater extent in the first configuration than the configuration.

106. The motorized vehicle of claim 96 wherein the anti-tip assembly comprises a second anti-tip wheel which is substantially fixed against translation and pivot relative to frame.

107. The motorized vehicle of claim 106, wherein when the motorized vehicle is in a normal operating mode characterized by a travel along substantially level ground, the first anti-tip wheel is positioned at a first distance off a ground surface and the second anti-tip wheel is positioned at a second distance off the ground surface wherein the first distance off the ground surface is less than the second distance off the ground surface.

108. The motorized vehicle of claim 107 wherein the first anti-tip wheel is pivotable to a third distance off the ground surface that is at least as long as the second distance off the ground surface.

109. The motorized vehicle of claim 96, wherein the anti-tip assembly has a second configuration wherein the first anti-tip wheel is both pivotable about the pivot axis and translatable along the sliding axis, the first anti-tip wheel being pivotable about the pivot axis to a greater extent in the first configuration than in the second configuration, and further comprising an anti-tip lock that is configured move between a locked configuration and an unlocked configuration wherein, in the locked configuration, the anti-tip assembly is in the second configuration.

110. The motorized vehicle of claim 109 wherein the anti-tip lock is configured to pivot from the unlocked configuration to the locked configuration, wherein the anti-tip lock is configured to engage a first stop coupled to the frame when the anti-tip assembly is in the first configuration, and wherein the anti-tip lock is configured to engage a second stop coupled to first anti-tip wheel when the anti-tip assembly is in the second configuration.

111. The motorized vehicle of claim 109 wherein the anti-tip lock is configured to restrict at least one of translation and rotation of the first anti-tip wheel when the anti-tip lock is in the locked configuration.

112. The motorized vehicle of claim 111 wherein, the first anti-tip wheel is translatable along the sliding axis by a shorter distance when the anti-tip lock is in the locked configuration than when the anti-tip lock is in the unlocked configuration.

113. The motorized vehicle of claim 109, further comprising a controller configured to cause an actuator signal to be sent to an actuator to move the anti-tip lock between the locked configuration and the unlocked configuration.

114. The motorized vehicle of claim 113, further comprising a condition sensor configured to sense a condition of the motorized vehicle, wherein the condition sensor is configured to send a condition signal to the controller indicative of the sensed condition of the motorized vehicle and the actuator signal is based on the condition signal.

115. The motorized vehicle of claim 114 wherein the condition sensor is configured to sense at least one of tilt, acceleration, deceleration, velocity and combinations thereof.

116. The motorized vehicle of claim 114 wherein the condition sensor comprises at least one of a tilt sensor, an accelerometer, a velocity sensor, a gyroscope, a position sensor, a gps sensor and combinations thereof.

117. The motorized vehicle of claim 107, wherein the second anti-tip wheel is positioned between the drive wheel and the first anti-tip wheel when viewed from a front of the motorized vehicle.

118. The motorized vehicle of claim 96, wherein the anti-tip assembly comprises a first anti-tip assembly and the motorized vehicle further comprises:

a second anti-tip assembly identical to the first anti-tip assembly that operates independently of the first anti-tip assembly.

119. The motorized vehicle of claim 96, wherein sliding axis is oriented at an acute angle to a line that is normal to a flat level ground surface when the motorized vehicle is operating on the flat level ground surface.

120. The motorized vehicle of claim 119 wherein the acute angle is configured to prevent the first anti-tip wheel from pivoting when the first anti-tip wheel engages a ground surface in response to the motorized vehicle traveling on a downslope.

121. The motorized vehicle of claim 119, wherein the acute angle is configured to allow the first anti-tip wheel to pivot when the first anti-tip wheel engages an obstruction in a path of the motorized vehicle.

122. The motorized vehicle of claim 119, wherein the acute angle is about 20 degrees.

123. The motorized vehicle of claim 120 wherein a threshold level of the downslope is in a range of 10 degrees to 25 degrees.

124. The motorized vehicle of claim 119, wherein the acute angle is within 5 degrees of the smallest angle such that, if selected as the acute angle, the drive wheel would have a reduced traction with the ground surface when the first anti-tip wheel engages an obstruction in a path of the motorized vehicle.

125. The motorized vehicle of claim 96 wherein the motorized vehicle has a longitudinal axis, and a centerline of the drive wheel is separated from a centerline of the first anti-tip wheel along the longitudinal axis by a distance of approximately 9 inches.

126. A motorized vehicle comprising:

a frame;

a drive wheel coupled to the frame;

a motor operatively coupled to the drive wheel; and an anti-tip assembly having a first anti-tip wheel, the anti-tip assembly having a first configuration wherein the first anti-tip wheel is both pivotable about a pivot axis relative to the frame and translatable along a sliding axis, wherein the anti-tip assembly has a configuration wherein the first anti-tip wheel is both pivotable about the pivot axis and translatable along the sliding axis, the first anti-tip wheel being pivotable about the pivot axis to a greater extent in the first configuration than in the configuration and translatable along the sliding axis to a greater extent in the first configuration than the configuration.

127. The motorized vehicle of claim 126, wherein the first anti-tip wheel is coupled to a pivot arm disposed about the sliding axis, the pivot arm coupled to the frame at the pivot axis.

128. The motorized vehicle of claim 126, wherein, in the first configuration, the first anti-tip wheel is translatable along the sliding axis independently of being pivotable about the pivot axis.

129. The motorized vehicle of claim 126, wherein, in the first configuration, the first anti-tip wheel is translatable along the sliding axis from a first position to a second position.

130. The motorized vehicle of claim 129 wherein in the first configuration, the first anti-tip wheel is translatable along the sliding axis to a maximum sliding distance of approximately 0.75 inches.

131. The motorized vehicle of claim 129, wherein, in the first configuration, the first anti-tip wheel is biased toward the first position.

132. The motorized vehicle of claim 129, wherein, in the first configuration, the first anti-tip wheel is pivotable about the pivot axis from an extended position to a retracted position, the retracted position being rearward of the extended position, and wherein the first anti-tip wheel is coupled to a pivot arm disposed about the sliding axis, the pivot arm coupled to the frame at the pivot axis and the motorized vehicle further comprises a biasing element coupled to the pivot arm and to the frame wherein, in the first configuration, the biasing element is configured to bias the first anti-tip wheel toward the extended position.

133. The motorized vehicle of claim 129, wherein, in the first configuration, the first anti-tip wheel is pivotable about the pivot axis from an extended position to a retracted position, the retracted position being rearward of the extended position, and wherein the first anti-tip wheel is biased toward the first configuration by a first biasing element and is biased toward the extended position by a second biasing element that is different from the first biasing element.

134. The motorized vehicle of claim 133, wherein a biasing force of the first biasing element is less than a biasing force of the second biasing element.

135. The motorized vehicle of claim 126 wherein the anti-tip assembly comprises a second anti-tip wheel which is substantially fixed against translation and pivot relative to frame.

136. The motorized vehicle of claim 135, wherein when the motorized vehicle is in a normal operating mode characterized by a travel along substantially level ground, the first anti-tip wheel is positioned at a first distance off a ground surface and the second anti-tip wheel is positioned at a second distance off the ground surface wherein the first distance off the ground surface is less than the second distance off the ground surface.

137. The motorized vehicle of claim 136 wherein the first anti-tip wheel is pivotable to a third distance off the ground surface that is at least as long as the second distance off the ground surface.

138. The motorized vehicle of claim 126, wherein the anti-tip assembly has a second configuration wherein the first anti-tip wheel is both pivotable about the pivot axis and translatable along the sliding axis, the first anti-tip wheel being pivotable about the pivot axis to a greater extent in the first configuration than in the second configuration, and further comprising an anti-tip lock that is configured move between a locked configuration and an unlocked configuration wherein, in the locked configuration, the anti-tip assembly is in the second configuration.

139. The motorized vehicle of claim 138 wherein the anti-tip lock is configured to pivot from the unlocked configuration to the locked configuration, wherein the anti-tip lock is configured to engage a first stop coupled to the frame when the anti-tip assembly is in the first configuration, and wherein the anti-tip lock is configured to engage a second stop coupled to first anti-tip wheel when the anti-tip assembly is in the second configuration.

140. The motorized vehicle of claim 138 wherein the anti-tip lock is configured to restrict at least one of translation and rotation of the first anti-tip wheel when the anti-tip lock is in the locked configuration.

141. The motorized vehicle of claim 140 wherein, the first anti-tip wheel is translatable along the sliding axis by a shorter distance when the anti-tip lock is in the locked configuration than when the anti-tip lock is in the unlocked configuration.

142. The motorized vehicle of claim 138, further comprising a controller configured to cause an actuator signal to be sent to an actuator to move the anti-tip lock between the locked configuration and the unlocked configuration.

143. The motorized vehicle of claim 142, further comprising a condition sensor configured to sense a condition of the motorized vehicle, wherein the condition sensor is configured to send a condition signal to the controller indicative of the sensed condition of the motorized vehicle and the actuator signal is based on the condition signal.

144. The motorized vehicle of claim 143 wherein the condition sensor is configured to sense at least one of tilt, acceleration, deceleration, velocity and combinations thereof.

145. The motorized vehicle of claim 143 wherein the condition sensor comprises at least one of a tilt sensor, an accelerometer, a velocity sensor, a gyroscope, a position sensor, a gps sensor and combinations thereof.

146. The motorized vehicle of claim 136, wherein the second anti-tip wheel is positioned between the drive wheel and the first anti-tip wheel when viewed from a front of the motorized vehicle.

147. The motorized vehicle of claim 126, wherein the anti-tip assembly comprises a first anti-tip assembly and the motorized vehicle further comprises:

a second anti-tip assembly identical to the first anti-tip assembly that operates independently of the first anti-tip assembly.

148. The motorized vehicle of claim 126, wherein sliding axis is oriented at an acute angle to a line that is normal to a flat level ground surface when the motorized vehicle is operating on the flat level ground surface.

149. The motorized vehicle of claim 148 wherein the acute angle is configured to prevent the first anti-tip wheel from pivoting when the first anti-tip wheel engages a ground surface in response to the motorized vehicle traveling on a downslope.

150. The motorized vehicle of claim 148, wherein the acute angle is configured to allow the first anti-tip wheel to pivot when the first anti-tip wheel engages an obstruction in a path of the motorized vehicle.

151. The motorized vehicle of claim 148, wherein the acute angle is about 20 degrees.

152. The motorized vehicle of claim 149 wherein a threshold level of the downslope is in a range of 10 degrees to 25 degrees.

153. The motorized vehicle of claim 148, wherein the acute angle is within 5 degrees of the smallest angle such that, if selected as the acute angle, the drive wheel would have a reduced traction with the ground surface when the first anti-tip wheel engages an obstruction in a path of the motorized vehicle.

154. The motorized vehicle of claim 126 wherein the motorized vehicle has a longitudinal axis, and a centerline of the drive wheel is separated from a centerline of the first anti-tip wheel along the longitudinal axis by a distance of approximately 9 inches.

155. A motorized vehicle comprising:

a frame;

a drive wheel coupled to the frame;

a motor operatively coupled to the drive wheel; and an anti-tip assembly having a first anti-tip wheel, the anti-tip assembly having a first configuration wherein the first anti-tip wheel is both pivotable about a pivot axis relative to the frame and translatable along a sliding axis, wherein the anti-tip assembly comprises a second anti-tip wheel which is substantially fixed against translation and pivot relative to frame, and wherein when the motorized vehicle is in a normal operating mode characterized by a travel along substantially level ground, the first anti-tip wheel is positioned at a first distance off a ground surface and the second anti-tip wheel is positioned at a second distance off the ground surface wherein the first distance off the ground surface is less than the second distance off the ground surface.

156. The motorized vehicle of claim 155, wherein the first anti-tip wheel is coupled to a pivot arm disposed about the sliding axis, the pivot arm coupled to the frame at the pivot axis.

157. The motorized vehicle of claim 155, wherein, in the first configuration, the first anti-tip wheel is translatable along the sliding axis independently of being pivotable about the pivot axis.

158. The motorized vehicle of claim 156, wherein, in the first configuration, the first anti-tip wheel is translatable along the sliding axis from a first position to a second position.

159. The motorized vehicle of claim 158 wherein in the first configuration, the first anti-tip wheel is translatable along the sliding axis to a maximum sliding distance of approximately 0.75 inches.

160. The motorized vehicle of claim 158, wherein, in the first configuration, the first anti-tip wheel is biased toward the first position.

161. The motorized vehicle of claim 158, wherein, in the first configuration, the first anti-tip wheel is pivotable about the pivot axis from an extended position to a retracted position, the retracted position being rearward of the extended position, and wherein the first anti-tip wheel is coupled to a pivot arm disposed about the sliding axis, the pivot arm coupled to the frame at the pivot axis and the motorized vehicle further comprises a biasing element coupled to the pivot arm and to the frame wherein, in the first configuration, the biasing element is configured to bias the first anti-tip wheel toward the extended position.

162. The motorized vehicle of claim 158, wherein, in the first configuration, the first anti-tip wheel is pivotable about the pivot axis from an extended position to a retracted position, the retracted position being rearward of the extended position, and wherein the first anti-tip wheel is biased toward the first configuration by a first biasing element and is biased toward the extended position by a second biasing element that is different from the first biasing element.

163. The motorized vehicle of claim 162, wherein a biasing force of the first biasing element is less than a biasing force of the second biasing element.

164. The motorized vehicle of claim 155 wherein the first anti-tip wheel is pivotable to a third distance off the ground surface that is at least as long as the second distance off the ground surface.

165. The motorized vehicle of claim 155, wherein the anti-tip assembly has a second configuration wherein the first anti-tip wheel is both pivotable about the pivot axis and translatable along the sliding axis, the first anti-tip wheel being pivotable about the pivot axis to a greater extent in the first configuration than in the second configuration, and further comprising an anti-tip lock that is configured move between a locked configuration and an unlocked configuration wherein, in the locked configuration, the anti-tip assembly is in the second configuration.

166. The motorized vehicle of claim 165 wherein the anti-tip lock is configured to pivot from the unlocked configuration to the locked configuration, wherein the anti-tip lock is configured to engage a first stop coupled to the frame when the anti-tip assembly is in the first configuration, and wherein the anti-tip lock is configured to engage a second stop coupled to first anti-tip wheel when the anti-tip assembly is in the second configuration.

167. The motorized vehicle of claim 165 wherein the anti-tip lock is configured to restrict at least one of translation and rotation of the first anti-tip wheel when the anti-tip lock is in the locked configuration.

168. The motorized vehicle of claim 167 wherein, the first anti-tip wheel is translatable along the sliding axis by a shorter distance when the anti-tip lock is in the locked configuration than when the anti-tip lock is in the unlocked configuration.

169. The motorized vehicle of claim 165, further comprising a controller configured to cause an actuator signal to be sent to an actuator to move the anti-tip lock between the locked configuration and the unlocked configuration.

170. The motorized vehicle of claim 169, further comprising a condition sensor configured to sense a condition of the motorized vehicle, wherein the condition sensor is configured to send a condition signal to the controller indicative of the sensed condition of the motorized vehicle and the actuator signal is based on the condition signal.

171. The motorized vehicle of claim 170 wherein the condition sensor is configured to sense at least one of tilt, acceleration, deceleration, velocity and combinations thereof.

172. The motorized vehicle of claim 170 wherein the condition sensor comprises at least one of a tilt sensor, an accelerometer, a velocity sensor, a gyroscope, a position sensor, a gps sensor and combinations thereof.

173. The motorized vehicle of claim 155, wherein the second anti-tip wheel is positioned between the drive wheel and the first anti-tip wheel when viewed from a front of the motorized vehicle.

174. The motorized vehicle of claim 155, wherein the anti-tip assembly comprises a first anti-tip assembly and the motorized vehicle further comprises:

a second anti-tip assembly identical to the first anti-tip assembly that operates independently of the first anti-tip assembly.

175. The motorized vehicle of claim 155, wherein sliding axis is oriented at an acute angle to a line that is normal to a flat level ground surface when the motorized vehicle is operating on the flat level ground surface.

176. The motorized vehicle of claim 175 wherein the acute angle is configured to prevent the first anti-tip wheel from pivoting when the first anti-tip wheel engages a ground surface in response to the motorized vehicle traveling on a downslope.

177. The motorized vehicle of claim 175, wherein the acute angle is configured to allow the first anti-tip wheel to pivot when the first anti-tip wheel engages an obstruction in a path of the motorized vehicle.

178. The motorized vehicle of claim 175, wherein the acute angle is about 20 degrees.

179. The motorized vehicle of claim 176 wherein a threshold level of the downslope is in a range of 10 degrees to 25 degrees.

180. The motorized vehicle of claim 175, wherein the acute angle is within 5 degrees of the smallest angle such that, if selected as the acute angle, the drive wheel would have a reduced traction with the ground surface when the first anti-tip wheel engages an obstruction in a path of the motorized vehicle.

181. The motorized vehicle of claim 155 wherein the motorized vehicle has a longitudinal axis, and a centerline of the drive wheel is separated from a centerline of the first anti-tip wheel along the longitudinal axis by a distance of approximately 9 inches.

* * * * *